United States Patent [19]

Gurza

[11] Patent Number: 4,495,165
[45] Date of Patent: Jan. 22, 1985

[54] METHOD OF PURIFICATION OF PHOSPHORIC ACID

[76] Inventor: Guillermo R. Gurza, Rio Balsa No. 62, Colonia Cuauhtemoc, Mexico

[21] Appl. No.: 538,138

[22] Filed: Oct. 3, 1983

[51] Int. Cl.$^3$ .............................................. C01B 25/16
[52] U.S. Cl. .............................. 423/321 R; 423/313; 423/316; 423/317
[58] Field of Search .................. 423/319, 320, 321 R, 423/321 S, 316, 317, 313

[56] References Cited

U.S. PATENT DOCUMENTS

| | | | |
|---|---|---|---|
| 1,981,145 | 11/1934 | Keller | 423/321 S |
| 2,492,714 | 12/1948 | Singer | 423/320 |
| 3,122,415 | 2/1964 | Gilchrist | 423/320 |
| 3,860,023 | 6/1975 | Pendergrast | 423/317 |
| 3,917,805 | 11/1975 | Takahara | 423/321 S |
| 3,993,733 | 11/1976 | Irani | 423/321 S |
| 3,993,736 | 11/1976 | Irani | 423/321 S |
| 4,256,570 | 3/1981 | Allen et al. | 423/321 R |
| 4,299,805 | 11/1981 | Wells | 423/321 R |
| 4,369,168 | 1/1983 | Wells et al. | 423/321 R |

FOREIGN PATENT DOCUMENTS

| | | | |
|---|---|---|---|
| 53-88691 | 4/1978 | Japan | 423/321 R |
| 1103224 | 2/1968 | United Kingdom | 423/321 R |
| 1442919 | 7/1976 | United Kingdom | 423/321 R |
| 285909 | 12/1971 | U.S.S.R. | 423/321 R |

Primary Examiner—Gregory A. Heller
Attorney, Agent, or Firm—Pravel, Gambrell, Hewitt & Kimball

[57] ABSTRACT

Appreciable inorganic impurities and organic matter are removed from impure phosphoric acid, particularly wet-process phosphoric acid, by pyrolysis of a mixture containing the raw acid and porous carbonaceous matter, including carbohydrates and chars, then leaching the pyrolyzed residue therefrom with a suitable solvent such as water to extract the purified phosphoric acid.

24 Claims, 6 Drawing Figures

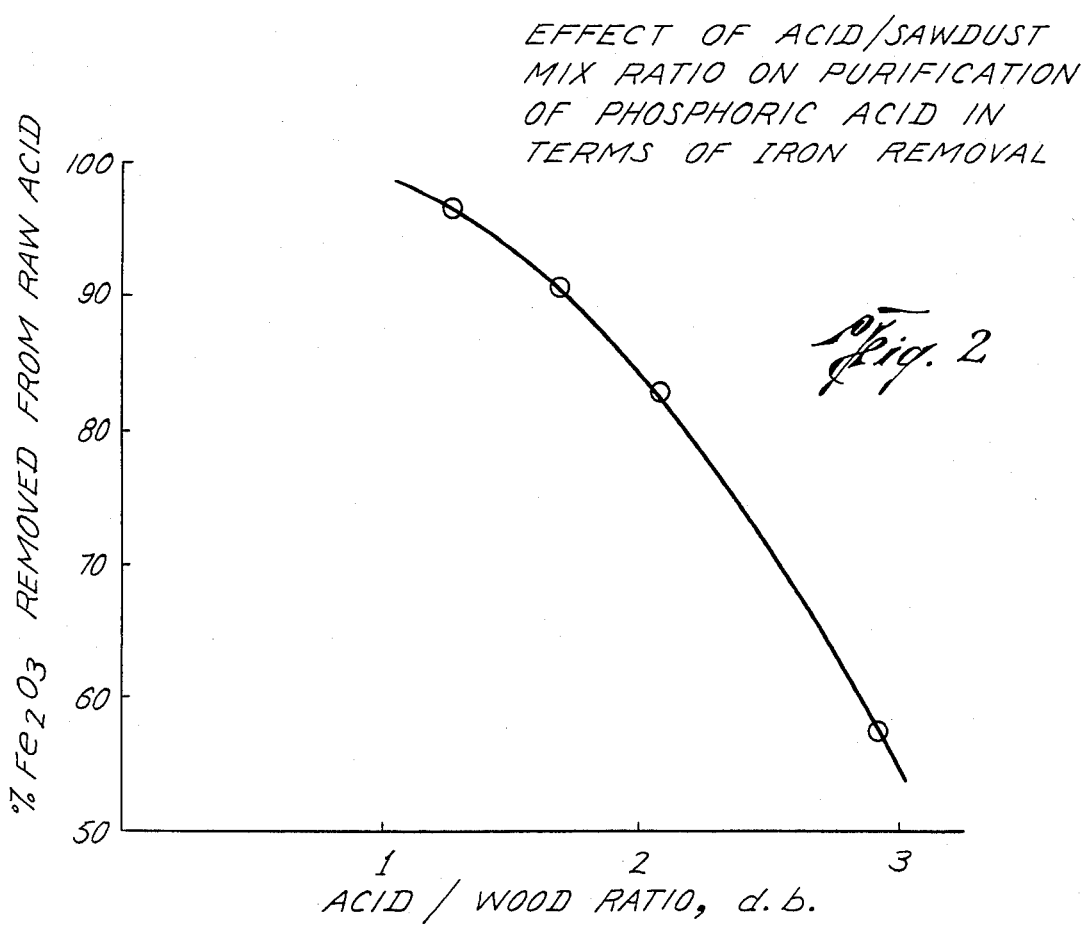
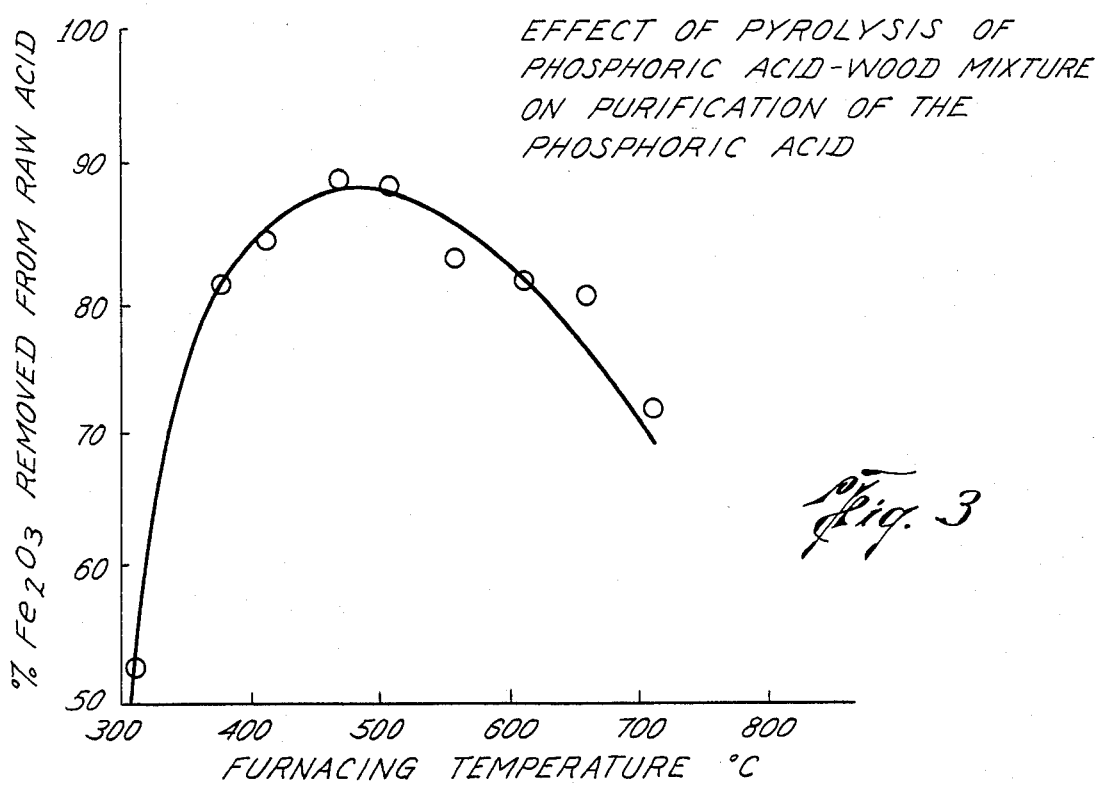

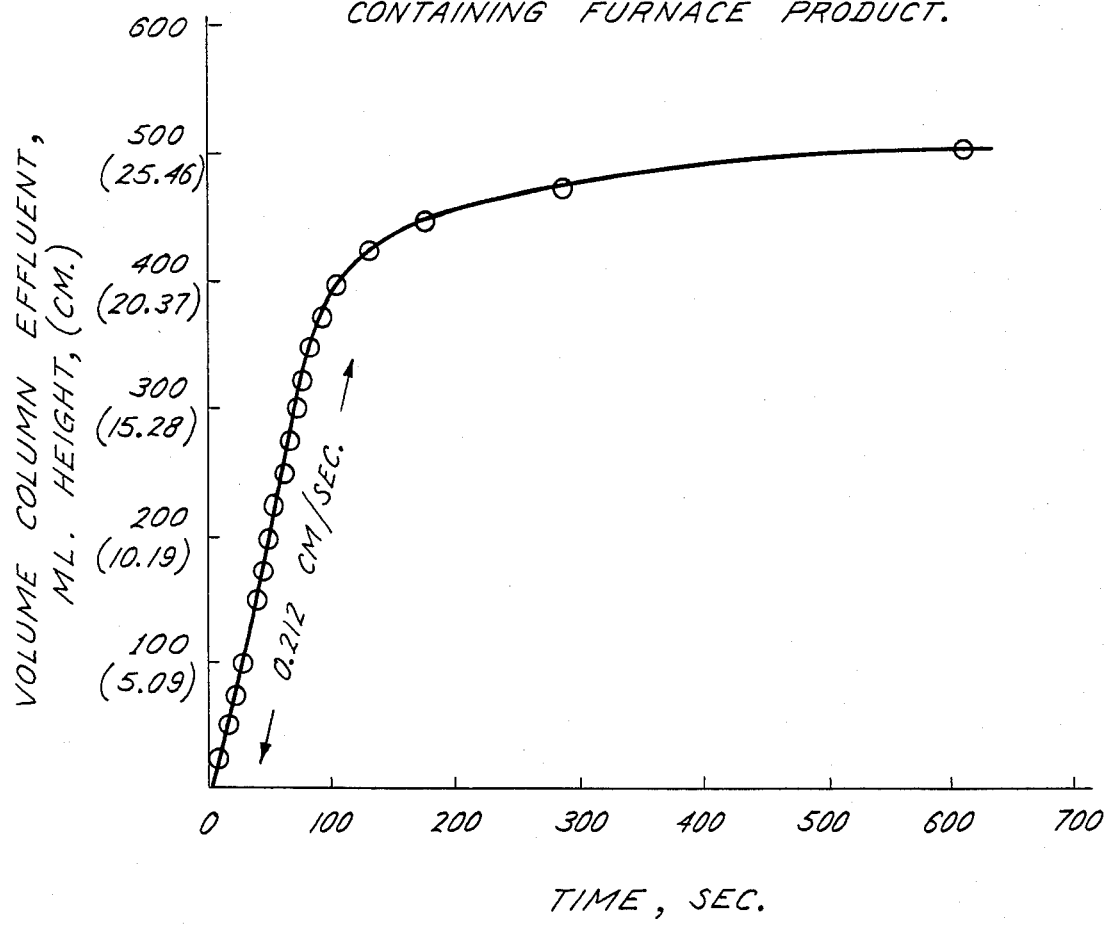

METHOD OF PURIFICATION OF PHOSPHORIC ACID

BACKGROUND OF THE INVENTION

Two processes for production of phosphoric acid are practiced. One is the so-called "dry process" in which "yellow phosphorous" (white phosphorous containing some of its allotrophic red form) is burned in air to produce phosphorous pentoxide which is then hydrolyzed to phosphoric acid. (Yellow phosphorous itself is produced in an electric furnace by reduction of phosphate compounds contained in the ore heated to high temperature by electrical current between two electrodes.) The process is capable of producing high purity phosphoric acid called "technical grade". "Food grade" phosphoric acid, used for example in the beverage industry, is made by removing the small amounts of arsenic in the technical grade acid.

However, about 60% of the current total phosphoric acid production in the United States is from the "wet process". Analysts project total phosphoric acid production in the United States at nearly 8.5 million tons (in terms of phosphoric anhydride—$P_2O_5$) for 1983 (Chem. & Eng. News, March, 1983, p.3). The fertilizer industry uses 85% of the "agriculture", "fertilizer", or "merchant" grade phosphoric acid made by the wet process. A major derivative for the agricultural industry is diammonium phosphate for fertilizer and other agricultural uses.

Wet process phosphoric acid is commonly manufactured by decomposing phosphate rock (apatite) with sulfuric acid. Any complex phosphate compound may be combined with either sulfuric acid or hydrochloric acid to obtain the wet process phosphoric acid. The priciple reaction is $$Ca_{10}(PO_4)_6F_2 + 10H_2SO_4,$$
$$6H_3PO_4 + 10CaSO_4 + 2HF.$$

The calcium sulfate (gypsum) and other solids are generally removed by filtration. Even so, the resulting acid contains considerable impurities, the extent and type depend mainly upon the grade of rock used. The balance of impurities consists of various inorganic compounds as well as colloidal carbonaceous matter which give the acid a dark brown appearance. Typical analyses of apatite rock from two sources in the United States are shown in TABLE 1A with percentage of wet process phosphoric acid produced from each of them by treatment of the rock with a mixture of sulfuric acid and wet-process phosphoric acid containing 25% $P_2O_5$.

TABLE 1A

| | Properties of Industrial Phosphoric Acids Wet Process (agricultural grade)[a] | | | |
|---|---|---|---|---|
| | Florida | | North Carolina | |
| Constituent, | % Rock | 43% $H_3PO_4$ | % Rock | 37% $H_3PO_4$ |
| $P_2O_5$ | 34.3 | 31.0 | 32.9 | 26.9 |
| CaO | 49.5 | 0.13 | 54.0 | 0.10 |
| MgO | 0.25 | 0.30 | 0.27 | 0.52 |
| $Fe_2O_3$ | 1.33 | 1.18 | 0.80 | 2.09 |
| $Al_2O_3$ | 1.28 | 0.66 | 0.80 | 1.40 |
| F | 3.84 | 1.91 | 3.99 | 1.30 |

[a]G. L. Bridger, et al., Ind. Eng. Chem. Process Des. Dev., 20 (3), 416–424, 1981.

In sharp contrast to the acid produced by the wet process, the clear, almost colorless phosphoric acid from the dry process (given in TABLE 1B) is very pure.

TABLE 1B

| | Food Grade Dry Process Acid[a] |
|---|---|
| Constituent | 75.1% $H_3PO_4$ |
| $P_2O_5$ | 54.4% |
| $H_2S$ | <0.1 ppm |
| $As_2O_3$ | 0.1 ppm |
| Fe | <10 ppm |
| Cl | <10 ppm |
| F | <1 ppm |
| $NO_3$ | <5 ppm |
| Heavy Metals | <5 ppm |

[a]Anon., Monsanto Company Tech. Bull. 1C/DP-239R

Food grade phosphoric acid is made from technical grade phosphoric acid (the product of the dry process) by the use of hydrogen sulfide gas bubbled into the acid to precipitate arseneous sulfide which is removed by filtration. (Some arsenic is always associated with phosphorous because of its similar chemical properties.)

Thus, wet process agricultural grade phosphoric acid contains considerably more impurities compared to dry acid. However, the dry process requires much more energy (electric furnacing at high temperatures) and is polluting to the atmosphere. Unprotected workers exposed to the elemental phosphorous vapors in the dry process may develop jaw bond decay.

In the United States the price of furnace (dry) phosphoric acid is currently about four times that of agricultural grade phosphoric acid. For these reasons, more attention in recent years has been directed toward the purification and upgrading of agricultural grade phosphoric acid to technical grade phosphoric acid which can then be readily converted to food grade phosphoric acid, especially since the reserves of high grade phosphate rock are being rapidly depleted in the United States.

Ion-exchange resins can be used to improve the purity of the agricultural grade phosphoric acid but cost and operating expense from inherent fouling of the resin make this process economically unattractive.

Much work has been done in recent years in the area of organic solvent extraction of phosphoric acid from wet-process water. High purity acid results since the organic solvent rejects most of the common impurities found in wet-process phosphoric acid. A literature review of the processes based on this principle is given by J. F. McCullough, Chem. Eng. 1976, 83 (26), 101-3. Other literature includes G. L. Bridger, Ind. Eng. Chem. Process Des. Dev., 1981, 20, 416-24; N. Takahara, Chem. Economy and Eng. Rev., April 1976, 8 (No. 4), 31–44; and M. S. Burova, et al., J. of App. Chem. of the U.S.S.R., Aug. 1978, 51 No. 8, Part 1, 1600–1604, as well as in U.S. Pat. No. 3,917,805. However, to date, processes based on the principle of solvent extraction are very complicated and require multiple extraction stages, high capital cost, and loss of solvent. In addition, the solvent which must be used is itself generally hazardous.

Active carbon has also been used to partly purify wet-process phosphoric acid. So far as known, its use has been restricted to removal of organic contaminants from the acid, and in processes which are different from the process of the present invention. Its use is described in U.S. Pat. Nos. 3,993,733; 3,993,736; 3,122,415 and in United Kingdom Patent No. 1,442,919. The active carbon purification requires a first step where the wet-process phosphoric acid is clarified, because it is easily fouled by suspended solids originally present in the acid after digestion of phosphate rock. In addition, the carbon is readily spent. A method by which a regeneration of the active carbon may be accomplished through further steps is described in European Patent Application No. 0,004,807.

Heretofore the purification by conventional means of crude wet-process phosphoric acid has only been accomplished by the use of high cost equipment and stringent controls. The operating costs of such a process make such a purification process only marginally profitable. Thus, there has been a great and long-standing need for a purification process requiring low capital and having low operating costs to "upgrade" the purity of wet-process phosphoric acid to the technical grade purity obtained with the prior art dry process.

SUMMARY OF THE INVENTION

It has been discovered by the inventive process described herein that appreciable amounts of the impurities in wet-process phosphoric acid can be reduced and in certain cases eliminated completely so as to upgrade the acid to technical grade phosphoric acid by mixing a porous carbonaceous material, preferably cellulose containing, with the impure phosphoric acid, followed by pyrolyzing the mixture and leaching the residue with a suitable solvent to recover the purified acid. The invention is particularly applicable to agricultural grade phosphoric acid which has been clarified. With this invention, inorganic as well as organic contaminants become chemically bonded to the porous carbonaceous material residue, leaving the bulk of phosphoric acid free for dissolution in a suitable solvent.

BRIEF DESCRIPTION OF THE DRAWINGS

FIG. 2 is a graph of the effect of the acid/sawdust mix ratio on purification of phosphoric acid through iron removal.

FIG. 3 is a graph of the effect of various furnacing temperatures on purification of the phosphoric acid.

FIG. 6 is a graph showing the relationship of time to the volume of effluent from a column containing furnace product.

DETAILED DESCRIPTION OF THE INVENTION

Figure 1:
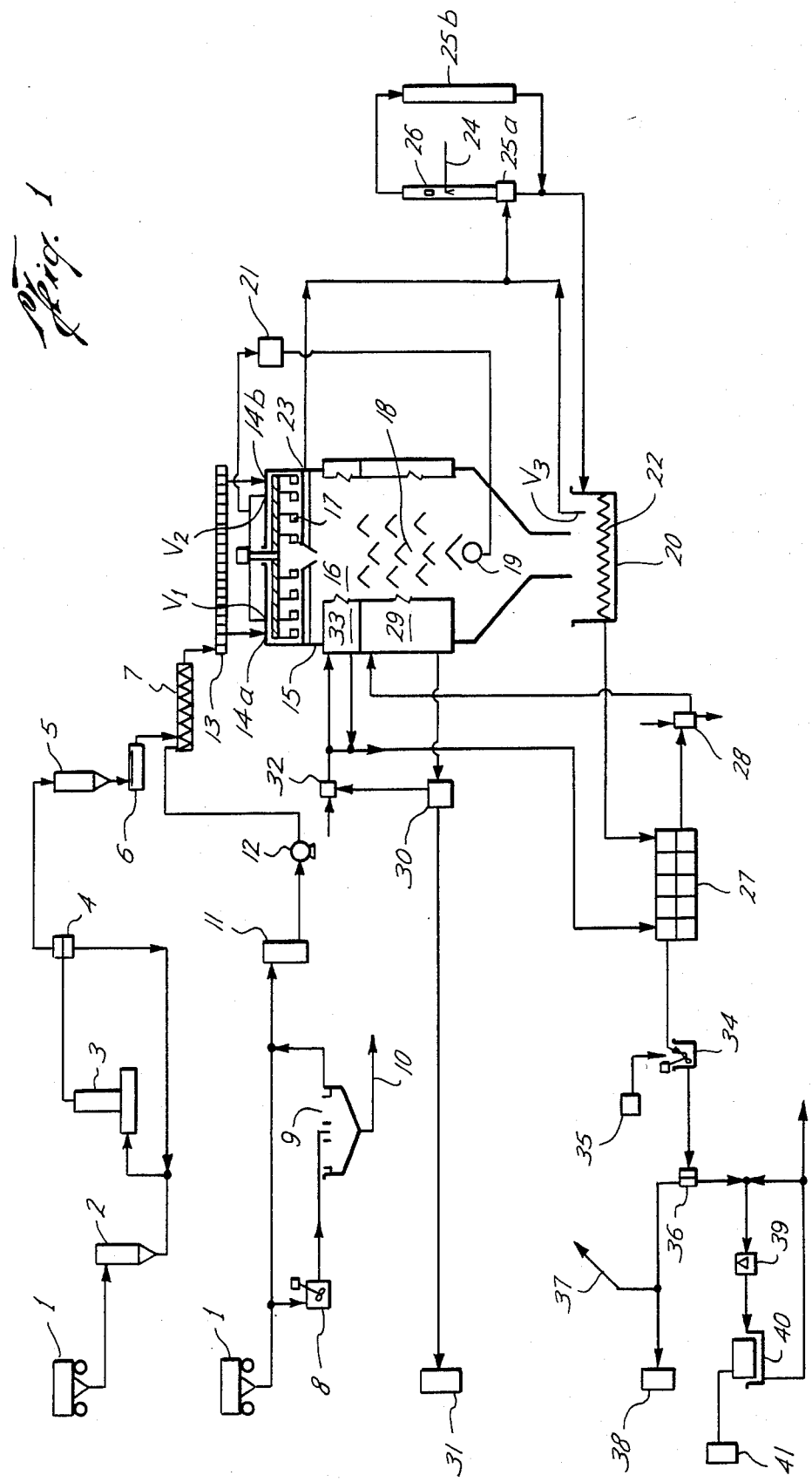
FIG. 1 shows a plant flow chart for the hereindescribed method for purification of phosphoric acid.

In the production of wet-process phosphoric acid, rock predominantly containing calcium and phosphorous, for example apatite, is ground and then digested with mineral acid. Although other acids may be employed, e.g., hydrochloric acid, the generally accepted practice is to use sulfuric acid. The crude phosphoric acid generated with sulfuric acid digestion of the rock commonly contains 24% to 34% by weight phosphorous as phosphoric anhydride—$P_2O_5$ (33% to 47% $H_3PO_4$). The raw acid is usually subjected to a separation step to remove gypsum ($CaSO_4$) which accompanies phosphoric acid production during digestion. Separation may employ filtration, although more often a unit clarifier is used. The clarified acid which still contains numerous impurities may be concentrated through water evaporation by heat.

With sulfuric acid digestion, calcium sulfate is produced and slowly precipitates in the acid. Other contaminants include carbonaceous matter, particularly humic acid and humates, which give the acid a very dark brown appearance. These organics may be removed by application of active carbon. However, extraneous inorganic materials associated with the rock itself are also present in the phosphoric acid. These numerous inorganics vary considerably even within a given mine. Also, additional inorganic impurities are introduced by the sulfuric acid which originated in the natural sulfur mined for production of sulfuric acid. Still other metallic contaminants are introduced from surface wear on equipment during milling of the rock.

In the present invention, these inorganic metallic components are incorporated into the porous structure of the porous carbonaceous material. The term "porous carbonaceous" material as used herein and in the claims refers to materials that have carbon in some form, such as carbohydrates or pure carbon, and have a porosity indicated by a total pore volume of, or greater than, 0.2 ml./gm. Some materials such as coal are suitable even though not initially porous enough, providing the porosity increases sufficiently during the processing by acid dehydration or by the heat during pyrolysis.

The type of carbonaceous material is believed to be unimportant, the predominant factor being sufficient porosity and availability to the contaminants, i.e., permeability of phosphoric impurities into the carbonaceous structure. Examples of materials suitable for the purpose of this invention include wood, bagasse, nut shells, fruit pits, rice hulls, paper, cotton, plant leaves, stems and other remains, as well as certain materials derived therefrom which may contain considerable porosity, for example, wood or bonechar, active carbon, coal or coke. Small particles of carbonaceous materials such as wood are preferable although larger particles may be employed if sufficient time is given during the initial mixing stage to effect the desired permeability of the phosphoric acid.

Also, an increase in the phosphoric acid concentration together with heating enhances permeability of the acid into the carbonaceous material. Therefore, pre-dried carbohydrate matter is preferable; for example, "green wood" may contain as much as 60% moisture which causes dilution of the phosphoric acid when the acid is added to the wood, and thus a subsequent decrease in the amount of acid penetration in the wood, as well as a prolongation of the dehydration stage during the initial heating of the mixture. Thus, the carbonaceous material preferably would not contain free moisture over 20%, and most preferably, not over 10%.

The acid-permeated carbonaceous matter is first fed to a heated, agitating reactor to effect dehydration of the mixture. A temperature of 100° C. can effect dehydration of the mixture. Dehydration includes loss of free water as well as the chemically bound water which is inherent in the cellulose structure of the carbonaceous material. Agitation is critical during this heating-dehydration stage because an unagitated mixture of sufficiently high acid-to-carbohydrate ratio, upon heating, cakes easily and tends to stick to surfaces. Beyond this "plastic stage", after dehydration is completely achieved, the material becomes granular and free-flowing. The material also develops a high specific heat during the plastic stage and heat transfer becomes difficult to achieve unless the material is well agitated.

Dehydration, (the "plastic stage") is preferably complete when a temperature between 160° C. and 280° C. is maintained steadily for about 15 minutes. It should be understood that a residence time of 15 minutes during this plastic stage is dependent upon a relatively high phosphoric acid concentration (about 70% or higher as $H_3PO_4$), as well as pre-dried carbonaceous material of a level of about 10% moisture content. It should be recognized that fixing the water fed to the plastic stage reactor is important in plant operation in order that the product from the plastic stage keeps pace with the subsequent furnacing operation for maximum throughput.

The hot granular product from the initial reactor is fed directly to a furnace for further heating thereafter to a higher temperature. The material remains granular and free-flowing throughout the furnacing operation. The temperature of the granular material in the furnace should reach a point between 200° C. and 1000° C., preferably a temperature between 400° C. and 600° C., as is illustrated in FIG. 3. Sufficient residence time to ensure a uniform bed temperature is necessary. A residence time as short as 5 minutes or less is adequate as long as a uniform final bed temperature is achieved. Conversely, a long residence time has some benefit in improving the purification of the acid, but the improvement is slight and usually not worth the decrease in throughput that would result. (See FIG. 4) The slight loss in capacity for acid impurities of the carbonaceous matter as a result of a short residence time can be compensated for by adjustment of other variables, i.e., the acid-to-carbonaceous matter ratio. In addition, the heating rate is relatively unimportant for both the capacity of the carbohydrate residue for acid contaminants or the leachability of the acid from the residue.

The hot discharged product from the furnace is quenched or washed in aqueous solution of the lowest possible volume, in order to maximize concentration of recovered acid. The quench solution preferably contains phosphoric acid from subsequent extraction stages. That is, the extraction of phosphoric acid from the furnace product is preferably done in a counter-current manner with aqueous solutions. By countercurrent, it is meant that at least two streams of solution flow past each other in opposite directions.

Sufficient time must be given to hydrolyze the condensed phosphoric acid within the solid carbonaceous residue. The phosphoric acid within the residue itself is about 115% expressed as $H_3PO_4$. Thus, as with phosphoric acid heated alone to high temperature, the acid becomes in part polymeric within the pores of the residue, i.e., polyphosphoric acid. Also, as with phosphoric acid alone subjected to high temperature heat treatment, the rate of dissolution of the acid in aqueous solutions is strongly temperature dependent. Thus, extraction may be done at a temperature of from about ambient to about boiling for the most rapid dissolution, but for practical considerations, the preferred temperature is in the range of 50° C. to 70° C., most preferably, 60° C. By ambient temperature it is meant that the temperature of the environment in which the extraction occurs, and by boiling, it is meant that the temperature at which the vapor pressure of the solution is equal to or very slightly greater than the atmospheric pressure of the environment.

About 20% of the original phosphoric acid (as acid salts) is retained in the pores of the carbon residue as phosphoric acid salts (for example, ferric hydroxyphosphate—$Fe(OH)(H_2PO_4)_2$), even after extensive water washing of the residue. This constitutes acid which is chemically bound both to the porous carbonaceous material residue itself as well as to the inorganic constituents removed from the raw acid. However, about 90% of this 20% chemically bound acid may be recovered by stripping or contacting the acid/carbonaceous material mixture with dilute alkaline or ammoniacal solution. The concentration of the stripping solution may vary considerably but is preferably 5% to 10% by weight. The stripping solution, of course, should be collected in a container separate from that holding the recovered phosphoric acid. The resulting phosphate salt-containing stripping solution may be used as a fertilizer agent.

The porous carbonaceous material may be reused to purify additional phosphoric acid containing impurities, with or without the use of carbonaceous material not previously used.

The phosphoric acid which has been purified according to this invention may be repeatedly purified according to the method disclosed herein, with carbonaceous material not previously used, to achieve cumulatively increasing degrees of purity.

To more completely describe the process, reference is made to the schematic drawing of FIG. 1. Raw materials are received into the plant by railcar or truck 1. The carbonaceous matter, e.g., sawdust, wood shavings, etc. is placed in a silo 2 to maintain an adequate feed stock. Material is drawn off the silo and fed into a blade-whizzer type mill 3 for proper sizing. After sizing, the material is passed through screen 4 to remove pieces larger than about ¼ inch. Any oversize material is recycled to the mill to be reworked.

The properly sized material is sent to a feed bin 5 where it is monitored onto a weigh belt 6 and delivered continuously in a steady stream to a paddle mixer 7 which mixer 7 also receives raw phosphoric acid from a stainless-steel clad storage tank 11 via a metering pump 12. Various types of crude phosphoric acid may be used, e.g., clarified agricultural grade acid or spent phosphoric acid from the metal-brightener industry. If the acid is clean, i.e., no sludge present, as is the case with metal-brightener acid, it is transferred directly from the railcar 1 to the stainless-steel storage tank 11, while acids with sediment present, such as certain types of agricultural grade acids, must pass through a clarifier 9 via an agitated stainless-steel storage tank 8 enroute from the railcar 1. The underflow 10 from the clarifier 9 is considered waste at this time and subject to proper disposal.

The amount of acid input to the paddle mixer 7 is pre-determined in order that the acid/carbonaceous material mixture consists of any given ratio between about 0.5 to 5 parts of phosphoric acid by weight (calculated as 100% $H_3PO_4$) and about 1 part of dry basis porous carbonaceous material. Residence time in the paddle mixer 7 must be sufficient for the acid to permeate the carbonaceous material completely; for example, about 15 minutes is considered adequate in the case of wood sawdust containing splinters no larger than ¼ inch width and phosphoric acid containing 65 to 80% $H_3PO_4$.

Discharge from the paddle mixer 7 is delivered by a screw conveyor 13 to the plastic-stage reactor 15 located above the main-reactor furnace 16. Feed enters the plastic stage reactor 15 from two ports 14a and 14b which are directly opposite each other at the periphery of the reactor. The material is pushed horizontally in a spiral path by means of properly angled "Teflon"-coated rakes 17 which move in a circular path. As the material moves from the outer perimeter to the opening of the plastic stage reactor 15, it is heated from ambient temperature to a temperature between 100° C. and 300° C. The preferred temperature of particles exiting from the plastic stage reactor 15 is between 160° C. and 280° C. The mixture undergoes a transition during its traversal in the reactor 15 from a wet mixture when it enters, to a sticky, agglomerating mixture, and then, finally, to a granular, free-flowing material as it exits the reactor 15 and enters the furnace 16. At 180° C. or higher, the mass becomes dehydrated, granular and free-flowing in the last portion of the plastic stage reactor. For this to occur, a residence time of about 30 minutes is sufficient, although a shorter residence time may be adequate if the mixture is heated more intensely or if the mixture contains less water by virtue of higher acid concentration or less moisture in the porous carbonaceous material such that the overall rise rate of material temperature is higher. Conversely, the residence time may be somewhat longer if a larger material load can be tolerated to give more throughput in the main reactor furnace 16. The plastic-stage reactor 15 and the rakes 17 are coated throughout with "Fluon", available from I.C.I. in Great Britain, or "Teflon", a trademarked product available from duPont de Nemours, E. I. & Co. (tetrafluoroethylene) to avoid cake build-up on the walls, floor or rake assembly of the reactor 15. The coating of rakes 17 is protected by some suitable means to avoid overheating.

The granular material which exits from the plastic-stage reactor 15 drops from the center of the reactor 15 into the main reactor furnace 16 where it cascades about angled stainless-steel plates 18, a few of which are schematically shown, toward the lower part of the furnace 16. The granular material is heated by a natural gas or oil fired burner 19 located at the bottom of the furnace 16. The temperature of the granular stream exiting the furnace may range between 200° C. and 1000° C., and is preferably between 400° C. to 600° C. The granular material falls into a drowning tank 20 below the furnace 16 where the product is cooled and later washed.

In the case of wood or similar carbonaceous materials, about 50% of the dry basis material is volatized as acetic acid, methanol, pyroligneous acids, oils and tars in the overall heating process. The acids and methanol are liberated in the initial heating stage in the plastic stage reactor 15. The acid fumes are very corrosive and must be effectively removed and collected separately. These fumes are removed from the plastic stage reactor 15 and collected in a concentrating tank 21 via vents $V_1$ and $V_2$ at the top of the plastic stage reactor 15. Sufficient draft is supplied to avoid venting of the fumes into the two open feed ports 14a and 14b at the periphery of the plastic-stage reactor 15. The fumes are concentrated into a liquid in the concentrating tank 21 whereupon the liquid is pumped and metered below the burner 19 in the furnace 16 where the condensed fumes are completely combusted at approximately 1000° C.

Volatile products are collected from the furnace 16 by an internal reactor vent 23 along with a vent $V_3$ at the top of the drowning tank 20 for effluent gases. These volatile gases enter a water spray 24 tower 25a and the dissolved volatiles are drained. The tower 25a is equipped with an electrostatic precipitator 26 to collect mist and particles. The volatiles include phosphorous compounds believed to be phosphoric acid-organic esters which readily hydrolyze to phoshoric acid which constitutes about 6% of the original starting acid. (The collected stream may also be treated in a tower 25b containing active carbon.) The cleaned phosphoric acid may be returned to the drowning tank 20.

The hot granular product from the furnace 16 drops directly into the stainless-steel clad drowning tank 20 which tank 20 also contains water and some phosphoric acid from tower 25a. The mixture is slowly agitated by mixer 22. The exothermic dissolution of phosphoric acid is rapid in the drowning tank 20 and equilibrium between the liquid in the bulk aqueous phase and the liquid within the solid is quickly attained at the high temperature of mixing.

The slurry in the drowning tank 20 is pumped to a counter-current (e.g., Rotocell) continuous extractor 27. Phosphoric acid is separated from the carbonaceous residue by continuous counter-current extraction. The extraction principles and equipment are well known to those versed in the art. Counter-current extraction is preferred in order to maximize the phosphoric acid concentration of recovered acid and to increase the efficiency of extraction of phosphoric acid from the granular carbonaceous residue. It is recognized that other solvents may be used besides water but water or solutions of water are preferred.

Phosphoric acid from the underflow of the extractor 27 is treated by a Zeolite water softener 28. The water softener 28 exchanges sodium for calcium, magnessium and potassium ions in the recovered acid; it is recognized that a hydrogen ion exchanger may also be used if considered desirable. A process back-washing system, i.e., sodium chloride addition, may be used for regenerating the Zeolite water softener 28 when necessary.

The recovered phosphoric acid from the counter-current extractor 27 is approximately 24% by weight $H_3PO_4$. The acid is concentrated to 80% by weight $H_3PO_4$, by heating the acid in a first heat exchanger 29 which is a stainless-steel shell surrounding the lower portion of the furnace 16. The effluent from the extractor 27 enters at the top of exchanger 29 and flows around the furnace 16 several times in a helical path and leaves at the bottom of the shell heat exchanger 29. The concentrated acid leaves the heat exchanger 29 at a temperature within the range of 120° C. to 150° C. It then enters a flash tank 30 where the acid is further concentrated to 80% $H_3PO_4$, after which the finished acid is sent to a suitable stainless-steel clad storage vessel 31.

The water vapors from the flash tank 30 are cooled in a water makeup vessel 32. The resultant condensed water is used in the counter-current extractor 27 with the optimum water temperature being 60° C. to 80° C. Hence, the water may be diverted to a second heat exchanger 33 placed around the upper portion of the furnace 16 and above heat exchanger 29 to add further heat if needed to raise the water temperature to about 60° C. to 80° C.

After water extraction, slurry containing the extracted solid residue is discharged into an agitating tank 34 where free phosphoric acid and acid salts bonded to the residue are stripped from the residue as diammonium or dialkaline (e.g., dipotassium) phosphate salts by the addition and contact of either dilute ammonium hydroxide or other dilute alkaline or ammoniacal solution from storage tank 35. The slurry is then pumped to screens 36 to remove the carbonaceous residue from the enriched phosphate liquor. The carbonaceous residue can either be sent back to the plant 37 for further use in the purification process as carbonaceous feed stock or properly disposed of or stored for future use in storage article 38.

The enriched phosphate salt liquor is taken from the screens 36 as liquid effluent and placed into an evaporative crystallizer 39. The solid material obtained in the liquor is either ammonium or alkali phosphate salt. The solid material is separated from the liquor by a vacuum filter 40 and is stored in an appropriate vessel 41. The liquid removed by the vacuum filter 40 can either be treated by a second pass through the crystallizer 39 to remove any entrained salts or disposed of as waste. Alternatively, the ammonium or alkali phosphate liquor may be concentrated somewhat for use in the fertilizer industry; in this case, crystallization and separation of the phosphate salt is not required.

EXAMPLES

The following examples relating to the process are given.

EXPERIMENT NO. 1. PHOSPHORIC ACID RAW MATERIAL

Agricultural grade phosphoric acid produced by sulfuric acid digestion of North Carolina rock was used. The acid was supplied through Texasgulf Chemical Co. The acid as received was clear with an emerald-green color. Such clear acids can be obtained from pre-calcined phosphate rock which destroys organic matter responsible for the dark color; alternatively the dark acid may be treated by active carbon which adsorbs the organic matter.

The acid as received was analyzed for constituent content as shown in TABLE 2.

TABLE 2

Chemical Composition of Agricultural Grade Phosphoric Acid Produced by Texasgulf Chemical Co. Using the "Wet-Process" on North Carolina Rock $H_3PO_4 = 72.95\%$
Light Absorbance = 0.517 calculated to 100% $H_3PO_4$ basis.

| Constituents | Acid As Received, % | Calc. to 100% $H_3PO_4$, % |
|---|---|---|
| $P_2O_5$ | 52.8 | 72.4 |
| $Al_2O_3$ | 0.378 | 0.518 |
| $Fe_2O_3$ | 1.57 | 2.15 |
| $Cr_2O_3$ | 0.109 | 0.149 |
| MnO | 0.230 | 0.315 |
| CaO | 0.003 | 0.004 |
| MgO | 0.970 | 1.330 |
| $As_2O_3$ | 0.056 | 0.077 |
| HgO | 0.055 | 0.075 |
| $SiO_2$ | 0.041 | 0.056 |
| $SO_3$ | 2.40 | 3.29 |

Phosphoric acid content was determined by titration with 0.5N standardized caustic solution to the second equivalence point with phenolpthalein indicator. It should be recognized that titration to the second equivalence point includes titration of acid salts, e.g., $NaH_2PO_4$. Light absorbance was measured on the acid as received through a 1 cm optical path at 455 nm wavelength, against distilled water. (A sample of technical grade furnace acid measured 0.018, same conditions.) Sulfur was determined by a LECO sulfur apparatus using a portion of sample neutralized with lithium carbonate. Fluoride was measured by an anion-sensitive electrode. The balance of constituents were determined by a Perkin-Elmer Atomic Absorption Unit; a graphite furnace with the AA unit was employed in the case of the arsenic measurement.

Considerable impurities were present in the acid as shown in TABLE 2.

The mixture of wood shavings and sawdust was obtained from a nearby furniture manufacturer. About 75% of the mixture consisted of sawdust with the balance being wood shavings from a planar mill. Both shavings, and sawdust were derived from kiln-dried woods. While most of the mixture was oak, other hardwood types of indeterminate proportions were present, including gum and mahogany.

Percent moisture content in a sample of the mixture was measured by taking the difference in weights, before and after heating overnight in an 80° C. forced draft oven. Also, a weighed portion of the dried sample in a porcelain crucible was ashed with final heating at 800° C. in a muffle furnace for one hour and the cooled dessicated ash was weighed. Percent moisture and ash are illustrated in TABLE 3.

TABLE 3

| Hardwood Shavings and Sawdust Mixture | |
|---|---|
| Moisture | 9.5% |
| Ash, d.b. | 0.70% |

A portion of the agricultural grade phosphoric acid was weighed and added to a weighed portion of the wood mixture in the ratio of 2 parts of acid (100% $H_3PO_4$ basis) to 1 part of dry basis wood. The mixture was stirred with a glass rod in a graphite cylindrical pot until the acid was observed to thoroughly permeate the wood—about 15 minutes. An insulated cover was removed from the cylindrical furnace and the pot set atop a grill above a propane gas burner. Combusted gases were vented from the chamber of the furnace containing the burner, and the fumes vented by a vent hood above the furnace during heating. These latter fumes were mostly those from the heated charge. For some runs, these fumes emitted from the charge during heating were collected in a water-sparger arrangement downstream from the exhaust fan. During initial heating, (the plastic stage), the contents of the graphite pot were constantly manually stirred with a glass rod. During stirring and heating the mixture changed in color from dark tan to jet black. A semi-liquid, sticky, caking state of the mixture was observed near a temperature of 150° C., which slowly converted to a dry-appearing, free-flowing granular mixture near 200° C. The bed shrank during the latter stages of heating. Acidic fumes were observed throughout the semi-liquid plastic state, which were tested by moistened litmus paper. Total time of heating through the plastic state was 45 minutes, but in separate experiments it was found that the reaction could be hastened with no adverse effects by applying more heat so that the plastic stage was completed in 15 minutes or less.

Following the plastic stage, the insulated cover with openings for the escape of volatiles was placed atop the furnace and heating was continued. The temperature was brought up to the desired level in 30 minutes and held at this level of 511° C. for 12 minutes before the heat supply was discontinued. During the 12 minute period of final heating, complete thermal equilibrium was established as measured by a dial thermometer inserted into the periphery of the bed through the insulated furnace cover, and by the temperature measured by a Chromel-Alumel* thermocouple inserted into a hole at the base of the graphite pot to the exact center of the pot. After cooling, the graphite pot and contents were removed from the furnace, and the contents removed and weighed. Results are furnished in TABLE 4.

*A trademark of Hoskins Mfg. Co., where such material may be purchased.

TABLE 4

Furnacing a Mixture of Phosphoric Acid and Wood
2.02 Ratio d.b. Wood/100% $H_3PO_4$
Final Yield 62.5%

Run 24

| Occurrence | Time (min) |
|---|---|
| Completion of Plastic Stage at 180° C. | 45 |
| Added Time to Reach Final Temperature of 511° C. | 30 |

| Hold Time at Final Temperature | 12 |
|---|---|
| Constituent | Weight, gms |
| Wood Charge | 150.0 |
| dry basis | 135.75 |
| Phosphoric Acid Charge | 375.0 |
| calc. 100% $H_3PO_4$ basis | 273.6 |
| d.b. Mixture Wood and Acid | 409.35 |
| Furnace Product | 255.8 |

No attempt was made to recover all the phosphoric acid retained by the carbonaceous residue (furnace product). Rather, only a representative portion sufficient for analysis was recovered by a single water extraction of the residue. For this purpose two circles of Whatman No. 1 filter paper were used in a Büchner funnel to contain the residue. Tap water was added to the furnace product within the Büchner funnel in an amount sufficient to cover the furnace product. After the product and water had set a few minutes, suction was applied and the filtrate collected. The collected filtrate was filtered through the furnace product again and collected a second time.

The filtrate was concentrated by water evaporation on a hot plant and a portion was taken for analysis. The once-extracted residue was collected, dried 52 hours in an 80° C. oven, then weighed. Results are given in TABLE 5.

TABLE 5

Single Water Extraction of Residue
72.0% $H_3PO_4$, 80 ml $H_3PO_4$

| Constituents | Weight, gms |
|---|---|
| Weight furnace product | 255.8 |
| Concentrated filtrate weight | 125.6 |
| Weight $H_3O_4$ | 90.4 |
| Weight dried washed residue | 181.9 |

TABLE 6 furnishes the analyses of the concentrated acid filtrate together with the analyses of the original starting acid calculated to 100% $H_3PO_4$ basis for comparison purposes. Methods of analysis were the same as for the tables above.

TABLE 6

Chemical Composition of Processed and Starting Phosphoric Acids

| | Original Acid 100% $H_3PO_4$ Basis | Processed Acid As Is | Processed Acid 100% $H_3PO_4$ Basis | % Removed |
|---|---|---|---|---|
| % $H_3PO_4$ | 100.0 | 72.0 | 100.0 | — |
| Light Absorbance | 0.517 | 0.097 | 0.135 | 73.9 |
| Constituent | % | % | % | % |
| $Al_2O_3$ | 0.518 | 0.008 | 0.011 | 97.9 |
| $Fe_2O_3$ | 2.15 | 0.134 | 0.186 | 91.4 |
| $Cr_2O_3$ | 0.149 | 0.062 | 0.086 | 42 |
| MnO | 0.315 | 0.110 | 0.153 | 51.4 |
| MgO | 1.330 | 0.264 | 0.367 | 72.4 |
| $As_2O_3$ | 0.077 | 0.008 | 0.011 | 86 |
| HgO | 0.075 | <0.005 | <0.007 | >91 |
| $SiO_2$ | 0.056 | 0.024 | 0.033 | 41 |
| F | 0.047 | <0.004 | <0.005 | >89 |
| $SO_3$ | 3.29 | <0.025 | <0.034 | >99 |

Results from this preliminary experiment show remarkably high removal of most constituents from the starting acid. Alumina, sulfur and iron removals are especially high.

EXPERIMENT NO. 2 PHOSPHORIC ACID EVALUATION

This experiment was done to investigate the process by use of another agricultural grade phosphoric acid derived from Florida rock. The run-of-plant phosphoric acid was obtained from the Freeport Chemical Company, Uncle Sam, Louisiana. Unlike the previously evaluated acid, this acid was less refined. It was dark brown in appearance due to the presence of organic material (presumably humates) and contained appreciable sludge (gypsum) estimated at 15% of the total sample. The sludge was allowed to settle and the supernatant liquid was decanted as needed, throughout this experiment and the ones to follow, as was a portion for analysis as well. Analytical methods were the same as those described in EXPERIMENT NO. 1. Organic matter was combusted in a sealed system (a combustion "train") and the evolved carbon dioxide was collected in barium oxide solution and the barium carbonate precipitate collected and weighed. Results are reported as elemental carbon. Results are given in the following TABLE 7.

TABLE 7

Chemical Composition of Agricultural Grade Phosphoric Acid Produced by Freeport Chemical Company by the "Wet-Process" from Florida Rock

| | As Received | 100% $H_3PO_4$ Basis |
|---|---|---|
| Light Absorbance | >3.00 | >3.86 |

TABLE 7-continued

Chemical Composition of Agricultural Grade Phosphoric Acid Produced by Freeport Chemical Company by the "Wet-Process" from Florida Rock

| % $H_3PO_4$ | 77.7 | 100.00 |
|---|---|---|
| Constituents | % | % |
| $P_2O_5$ | 56.25 | 72.4 |
| $Al_2O_3$ | 0.459 | 0.591 |
| $Fe_2O_3$ | 1.43 | 1.84 |
| CaO | 0.004 | 0.005 |
| MgO | 0.421 | 0.542 |
| $As_2O_3$ | 0.003 | 0.004 |
| HgO | 0.024 | 0.031 |
| $SiO_2$ | 0.041 | 0.053 |
| F | 0.087 | 0.112 |
| $SO_3$ | 0.58 | 0.746 |
| Organic as C | 0.45 | 0.58 |

In a chemical sense this acid is more pure than the previously used acid in EXPERIMENT NO. 1.

The mixture of wood shavings and sawdust was the same mixture as that used in EXPERIMENT NO. 1, except a slightly higher ratio of acid to sawdust was used compared to that of EXPERIMENT NO. 1.

The sawdust and acid were mixed and then heated by the same equipment and techniques as those previously described in EXPERIMENT NO. 1, with one major exception—more intense heat was applied during this plastic stage compared to the heat of EXPERIMENT NO. 1, with the result that the plastic stage was completed in only 12 minutes. Following completion of the plastic stage, thermal equilibrium was attained within 26 minutes of additional heating. This final temperature was somewhat less than that of EXPERIMENT NO. 1° −500° C., rather than 511° C. The final temperature was held 15 minutes before the heat source was discontinued. Results of heating are given in TABLE 8.

TABLE 8

Run 17
Furnacing a Mixture of Agricultural
Grade Phosphoric Acid and Wood Mix

| Moisture in wood mix, % | 11.25 |
|---|---|
| Weight wood charge, g. | 100.0 |
| dry basis, g. | 88.75 |
| Weight $H_3PO_4$ charge, g. | 250.0 |
| 100% $H_3PO_4$ basis, g. | 194.25 |
| Total weight charge, d.b., g. | 283.0 |
| Ratio 100% $H_3PO_4$ to d.b. wood | 2.19 |
| Min. to complete plastic stage | 12 |
| Final bed temperature, °C. | 500 |
| Time at final temperature, min. | 15 |
| Weight furnace product, g. | 198.1 |
| Yield F.P. from d.b. charge, % | 70.0 |

In water extraction of the solid residue, as in EXPERIMENT NO. 1, no attempt was made to recover all the available phosphoric acid contained in the residue; a single extraction was used to obtain a representative portion of recovered acid for analysis. The procedure was exactly the same as that in EXPERIMENT NO. 1. Results are given in TABLE 9.

TABLE 9

Single Water Extraction of Furnace Product

| Weight furnace product, g. | 198.1 |
|---|---|
| Concentrated acid filtrate | |
| Weight, g. | 86.5 |
| % $H_3PO_4$ | 59.3 |
| Wt. 100% $H_3PO_4$, g. | 51.3 |
| Wt. dried washed residue, g. | 115.3 |

Chemical constituents of the recovered, concentrated acid from the single water extraction were measured by the same analytical methods as those described previously for EXPERIMENT NO. 1 and for the original acid. Constituents of very low value in the original acid were not measured in the process acid. Results are given in TABLE 10, together with those of the original acid calculated to 100% $H_3PO_4$ for comparison purposes.

TABLE 10

Chemical Composition of Starting and Processed Phosphoric Acids

| | Original Acid | Processed Acid | | % Removed |
|---|---|---|---|---|
| | 100% $H_3PO_4$ Basis | As is | 100% $H_3PO_4$ Basis | |
| % $H_3PO_4$ | 100.0 | 59.3 | 100.0 | — |
| Light Absorbance | >3.86 | 0.366 | 0.617 | >84 |
| Constituents | % | % | % | % |
| $P_2O_5$ | 72.4 | 42.9 | 72.4 | — |
| $Al_2O_3$ | 0.591 | 0.015 | 0.025 | 95.8 |
| $Fe_2O_3$ | 1.84 | 0.066 | 0.111 | 94.0 |
| HgO | 0.031 | 0.005 | 0.008 | 74 |
| $SiO_2$ | 0.053 | 0.024 | 0.040 | 24 |
| F | 0.112 | <0.004 | <0.007 | >94 |
| $SO_3$ | 0.746 | <0.025 | <0.042 | >94 |
| Organic C | 0.58 | N.D. | N.D. | 100 |

Again, as with the previous acid, high levels of constituents were removed from the raw acid as a result of processing. Not surprising, all of the organic carbon was removed from the starting acid with a striking change in appearance from a muddy dark brown to a clear, very light green liquid.

EXPERIMENT NO. 3 PHOSPHORIC ACID EVALUATION

Another sample of phosphoric acid of altogether different composition was obtained from the aluminum metal brightener industry, Van Waters and Rogers Company. This acid was originally techincal grade acid made by the furnace process and had an original concentration of 80% $H_3PO_4$. Nitric acid and detergents had been added to the acid prior to spending in brightening aluminum metal. Thus, in addition to these additives the acid contained a significant quantity of aluminum which had dissolved into the acid during the brightening operation. Analytical analysis results are furnished in TABLE 11 by use of the same analytical methods as had been employed previously.

TABLE 11

Chemical Composition of Phosphoric Acid Spent In Brightening Aluminum Metal

|  | As Received | 100% $H_3PO_4$ Basis |
| --- | --- | --- |
| Light Absorbance | 0.022 | 0.034 |
| % $H_3PO_4$ | 63.65 | 100.0 |
| Constituents | % | % |
| $P_2O_5$ | 46.1 | 72.4 |
| $Al_2O_3$ | 3.02 | 4.74 |
| $Fe_2O_3$ | 0.013 | 0.020 |
| CaO | 0.003 | 0.005 |
| MgO | 0.041 | 0.064 |
| $As_2O_3$ | 0.009 | 0.014 |
| HgO | 0.016 | 0.025 |
| $SiO_2$ | 0.009 | 0.014 |
| F | <0.004 | <0.006 |
| $SO_3$ | <0.05 | <0.08 |

Except for aluminum, all of the constituents are present in low values in the phosphoric acid.

In mixing and heating the mixture in EXPERIMENT NO. 3, the same wood mixture was used as that used in the tests of EXPERIMENT NOS. 1 and 2. The same kind of equipment and techniques as those used in EXPERIMENT NO. 2 were used in EXPERIMENT NO. 3. Results are given in TABLE 12. For comparison, the results from the previous two experiments are included.

TABLE 12

Furnacing Phosphoric Acid-Wood Mixtures

|  | Phosphoric Acid Source Expt. No. | | |
| --- | --- | --- | --- |
|  | #3 | #1 | #2 |
|  | Run No. | | |
|  | 20 | 24 | 17 |
|  | Van Waters | Texas Gulf | Freeport |
| Constituents | Weight, grams | | |
| Weight wood charged | 150.0 | 150.0 | 100.0 |
| Dry basis | 133.1 | 135.75 | 88.75 |
| Weight Phosphoric Acid | 375.0 | 375.0 | 250.0 |
| 100% $H_3PO_4$ basis | 238.7 | 273.6 | 194.25 |
| Total Wt. d.b. mixture | 371.8 | 409.35 | 283.0 |
| Weight furnace product | 268.1 | 255.8 | 198.1 |
| Occurrence | Time (min) | | |
| Time to complete plastic | 14 | 45 | 12 |
| Added time to final temp. | 29 | 30 | 26 |
| Time at final temperature | 7 | 12 | 15 |
| Ratio acid to wood, d.b. | 1.79 | 2.02 | 2.19 |
| Final bed temperature °C. | 490 | 511 | 500 |
| Yield F.P. from d.b. mixture, % | 72.1 | 62.5 | 70.0 |

The solid residue was extracted in a single stage, as were the previous two experiments. Results are given in TABLE 13, together with those from the previous two experiments, for comparison.

TABLE 13

Single Water Extraction of Phosphoric Acids from Furnace Product

|  | Phosphoric Acid Source Expt. No. | | |
| --- | --- | --- | --- |
|  | #3 Van Waters | #1 Texas gulf | #2 Freeport |
| Constituents | Weight, gms | | |
| Weight furnace product | 268.1 | 255.8 | 198.1 |
| Concentrated $H_3PO_4$ filtrate |  |  |  |
| Weight | 85.2 | 125.6 | 86.5 |
| % $H_3PO_4$ | 61.0 | 72.0 | 59.3 |
| Wt. $H_3PO_4$ | 52.0 | 90.4 | 51.3 |
| Weight dried washed residue | 182.4 | 181.9 | 151.3 |

TABLE 14 furnishes analysis of the concentrated phosphoric acid recovered, as well as the analysis of the starting acid expressed on a 100% $H_3PO_4$ basis for comparison purposes. Not all the components in the recovered acid were measured due to the small quantities present in the original acid.

TABLE 14

Chemical Composition of Processed and Starting Phosphoric Acids

|  | Van Waters Original Acid 100% $H_3PO_4$ Basis | Processed Acid | | % Removed |
| --- | --- | --- | --- | --- |
|  |  | As is | 100% $H_3PO_4$ Basis |  |
| % $H_3PO_4$ | 100.0 | 63.65 | 100.0 | — |
| Light Absorbance | 0.034 | 0.028 | 0.044 | — |
| Constituents | % | % | % |  |
| $P_2O_5$ | 72.4 | 46.1 | 72.4 | — |
| $Al_2O_3$ | 4.74 | 0.013 | 0.021 | 99.6 |
| $Fe_2O_3$ | 0.020 | <0.002 | <0.003 | >85 |
| HgO | 0.025 | 0.006 | 0.010 | 60 |

The process is particularly effective in removing aluminum from low grade phosphoric acids. Despite the high concentration of aluminum present in the original acid it was almost totally removed as a result of the processing. The color of the original and the processed phosphoric acids are about the same. The low light absorbance is comparable to that of either reagent grade or technical grade phosphoric acid—0.018.

After the preliminary experiments given above, attention was directed toward investigating the variables of the process.

EXPERIMENT NO. 4. EFFECTS OF ACID-WOOD RATIO

The effects of the phosphoric acid to wood ratio were investigated. The agricultural grade phosphoric acid from Freeport Chemical Company (used in EXPERIMENT NO. 2), was used throughout, as well as the same sawdust and wood shavings mixture used in the previous three experiments. Ratios between 1.26 and 2.94 (100% $H_3PO_4$ basis and dry basis wood) were studied. The same equipment and techniques were used as those used in the previous three experiments. To reduce the analytical load, only iron was used as the criterion of effect, i.e., the degree of purification of starting acid was measured in terms of iron removal. As before, only a single water extraction was employed throughout. Results are given in TABLE 15.

TABLE 15

Effects of Acid-Wood Ratio Using Agricultural Grade Phosphoric Acid from Freeport Chemical Company and a Mixture of Wood Shavings and Sawdust 11.25% moisture in wood
74.5% $H_3PO_4$ in acid
1.43% $Fe_2O_3$ = 1.92% $Fe_2O_3$ (100% $H_3PO_4$ basis)

| | d.b. Acid-wood Ratio | | | |
|---|---|---|---|---|
| | 1.26 | 1.68 | 2.10 | 2.94 |
| | Run No. | | | |
| | 10 | 9 | 8 | 12 |
| Wood charge weight, d.b., g. | 155.3 | 155.3 | 133.1 | 155.3 |
| Acid charge weight, d.b., g. | 195.6 | 260.8 | 279.4 | 456.3 |
| Total Wt. mixture, d.b., g. | 350.9 | 416.1 | 412.5 | 611.6 |
| Time complete plastic stage (min.) | 8 | 10 | 12 | 18 |
| Total heating time (min.) | 68 | 65 | 53 | 59 |
| Final bed temperature, °C. | 500 | 500 | 500 | 500 |
| Concentrated Filtrate | | | | |
| Weight, g. | 124.5 | 167.1 | 155.0 | 309.8 |
| % $H_3PO_4$ | 69.85 | 71.35 | 71.1 | 66.3 |
| % $Fe_2O_3$ | 0.041 | 0.127 | 0.243 | 0.543 |
| % $Fe_2O_3$ (100% $H_3PO_4$ basis) | 0.059 | 0.178 | 0.342 | 0.820 |
| % $Fe_2O_3$ removed in process | 96.5 | 90.7 | 82.2 | 57.3 |

As the acid-wood ratio increases, the percent iron removal from the starting acid decreases and the plastic stage heating time is prolonged. The effect on acid purification in terms of iron removal is shown in the plot of FIG. 2. As is to be expected, the quantity of acid recovered increases as does the acid-wood ratio.

With increasing acid-wood ratio the plastic stage becomes more pronounced. For ratios less than about 1.3 (dry basis), the semi-liquid state is not observed; the particles are free-flowing throughout the process at the low acid-wood ratios. At the 1.3 ratio a slight plasticity is observed and the particles are only slightly sticky as the mass undergoes dehydration.

At the 1.7 ratio a definite plastic state is observed, but no bed expansion occurs. At the 2.1 ratio the plastic state is pronounced and the bed expands somewhat initially. At the 2.9 ratio the acid does not appear to completely wet the wood and a slight excess of acid appears evident. At this high ratio the bed froths and expands about four-fold during heating throughout the plastic stage. However, the bed appears black and homogeneous, unlike its appearance at a lower ratio (say 1.8) in which the particles are still discrete, although soft and sticky. However, even at the high acid-wood ratio of 2.9 (d.b.) agglomerates form at the completion of the plastic stage and the mass becomes completely granular and free-flowing providing the mixture is continually stirred. Otherwise, without stirring a massive homogeneous cake forms and the material sticks to the walls of the container. Past the plastic stage, even for high ratios, the particles persist in a granular, free-flowing stage throughout the balance of processing, although the particles are more fragile than those formed at lower ratios. Also, pronounced bed shrinkage occurs only after completion of the plastic stage.

In addition, at very low ratios (say 1.3) discrete particles of wood, although black, with their typical woody structure (e.g. cells) can still be recognized, but as the ratio increases the structure becomes more difficult to recognize until at the 2.9 ratio no recognizable structure remains—the structure remains amorphous throughout the balance of processing.

The blackening of the mixture during initial heating is due to loss of chemically bound water in the cellulose struture of the wood. Most woods contain up to 50% cellulose. In addition to this loss, the volatilization of various chemicals, e.g., methanol, acetic acid, pyroligneous acids, oils and tars occurs. Accompanying these chemical events is an exothermic heat effect near 350° C. during furnacing. The cause of this effect is unknown.

While ratios between 0.5 and 5 (dry basis) are effective depending upon the degree of acid purification required, a ratio near 2 appears practical and is considered preferable because at this ratio the wood is homogeneously permeated with the phosphoric acid (unlike low ratios) and no excess, free acid is evident (unlike high ratios). Thus, dry basis ratios between 1.0 and 2.5 of acid-carbonaceous material such as wood are preferred, with the provision that some carbonaceous materials may be deficient in cellulose and have a lower preferred range of acid-to-carbohydratge ratio which high cellulosic materials (such as cotton) have a higher preferred range of ratios.

EXPERIMENT NO. 5. EFFECTS OF FURNACING TEMPERATURE

Unlike the earlier described experiments, pine sawdust from kiln-dried wood was used throughout EXPERIMENT NO. 5. The sawdust was obtained from a local wood mill. Pieces larger than ¼ inch in width (splinters) were removed from the sawdust prior to use. The agricultural grade phosphoric acid from Freeport Chemical Company was used throughout. The same equipment and procedures were used for mixing, initial heating, and furnacing as those previously described.

Charge weights of acid and sawdust were fixed for each temperature level. That is, the acid-to-sawdust ratio was fixed at 2.10 dry basis. During furnacing and once the desired temperature was reached a hold time at the final temperature of 10 minutes was practiced for each run. In this time interval thermal equilibrium was achieved. Temperatures were measured at two locations, one by a thermometer inserted through the upper insulated cover into the bed at its periphery. The other temperature represented a point at the center of the pot within the solid bottom of the pot, i.e., a thermocouple was inserted into a horizontal hole drilled into the bottom of the cylindrical graphite pot extending to the center of the pot. The bed temperature was slightly less than the temperature of the graphite pot (about 10° C. less). After each run the furnace product was collected, weighed and then washed with tap water on a Büchner funnel using Whatman No. 1 filter paper for three successive extractions. The liquor in the funnel was completely drained between extractions. Two filtrations were done for each water extraction, i.e., the filtrate was filtered through the solid a second time for each extraction. Following the three water extractions the filtrates were combined and concentrated on a hot plate by water evaporation. The percentages of phosphoric acid and iron were measured on a portion of the weighed concentrated filtrate.

Results are given in TABLE 16.

TABLE 16

Effects of Temperature on Purifying Agricultural Grade Phosphoric
Acid from Freeport Chemical Company by Pyrolysis of a Mixture of
The Acid and Pine Sawdust Acid: 77.3% $H_3PO_4$, 1.065% $Fe_2O_3$ = 1.38% $Fe_2O_3$, 100% $H_3PO_4$ basis.

Fixed variables:
133.1 g d.b. sawdust
279.4 g acid calculated to 100% $H_3PO_4$ basis
412.5 g d.b. mixture
2.10 acid-to-sawdust ratio, d.b.
10 minutes hold time at final temperature
Temperatures given are pot temperatures as described

| Temp., °C. | 313 | 374 | 412 | 467 | 509 | 561 | 610 | 660 | 710 |
|---|---|---|---|---|---|---|---|---|---|
| Run No. | 39 | 40 | 38 | 37 | 36 | 41 | 35 | 33 | 34 |
| Plastic stage, min. | 12 | 13 | 14 | 13 | 14 | 13 | 13 | 12 | 12 |
| Ttl. ht. time, min. | 23 | 26 | 32 | 38 | 40 | 44 | 47 | 76 | 89 |
| Temperature, °C. | 313 | 374 | 412 | 467 | 509 | 561 | 610 | 660 | 710 |
| Wt. furnace product, g. | 353.1 | 349.7 | 315.1 | 309.1 | 296.1 | — | 274.9 | 276.0 | 192.8 |
| Yd. from mxt, % | 85.6 | 84.8 | 76.4 | 74.9 | 71.8 | — | 66.6 | 66.9 | 46.7 |
| Conc. Filtrate, g. | 327.1 | 270.4 | 254.0 | 251.9 | 254.7 | — | 228.4 | 211.5 | 131.5 |
| % $H_3PO_4$ | 65.75 | 71.3 | 72.75 | 71.35 | 69.6 | 70.3 | 71.15 | 69.45 | 68.0 |
| Wt. 100% $H_3PO_4$, g. | 215.1 | 192.7 | 184.8 | 179.7 | 177.3 | — | 162.5 | 146.9 | 89.4 |
| Yd. 100% $H_3PO_4$, % | 77.0 | 69.0 | 66.1 | 64.3 | 63.4 | — | 58.2 | 52.6 | 32.0 |
| % $Fe_2O_3$ | 0.428 | 0.186 | 0.153 | 0.109 | 0.108 | 0.162 | 0.171 | 0.188 | 0.264 |
| % $Fe_2O_3$ 100% $H_3PO_4$ | 0.651 | 0.261 | 0.210 | 0.153 | 0.155 | 0.230 | 0.240 | 0.271 0.388 | |
| % $Fe_2O_3$ removed | 52.8 | 81.1 | 84.8 | 88.9 | 88.8 | 83.3 | 82.6 | 80.4 | 71.9 |

While considerable improvement in the purity of phosphoric acid occurs throughout the range of temperatures employed, the results indicate an optimum temperature between 450° C. and 550° C. as the plot of FIG. 3 shows. The purification of starting acid is in terms of iron removal. Some degree of purification is effected over a broad range of temperatures, 200° C. to 1000° C., but the preferred range of temperatures in furnacing mixtures of phosphoric acid and carbonaceous materials is between 400° C. and 600° C., and more particularly between 450° C. and 550° C.

At temperatures lower than that temperature corresponding to maximum purification of acid, the impurities are probably not permanently fixed in the carbon matrix, while at temperatures higher than those corresponding to maximum purification, the porosity of the carbon decreases with increasing temperature such that the porosity of the carbon cannot accomodate the impurities as well. It is well established that the porosity of a non-graphitizable carbonaceous material (such as cellulose) decreases with an increas in temperature.

Otherwise, both the furnace product yield from the dry basis mixture, as well as recovered phosphoric acid yield from the starting acid decrease with increasing heat treatment temperature. Both decreases in yield are due to partial volatilization of phosphoric acid as organic esters during heating. The phosphoric-organic esters are rapidly hydrolyzed and are easily recovered from water-scrubbing the furnace volatiles and do not represent a loss of phosphoric acid in the process. Water scrubbing is provided in the plant process in order to recover the volatilized phosphoric acid (see FIG. 1).

EXPERIMENT NO. 6. HOLD TIME AT FINAL TEMPERATURE

An investigation was made to determine the effects of hold time of the phosphoric acid-sawdust mixtures at each of three furnacing temperatures. Effects were measured in terms of iron removal from the agricultural grade phosphoric acid from Freeport Chemical Company. Pine sawdust was used throughout. All other variables were fixed as in EXPERIMENT NO. 5. Equipment and procedures were exactly as described for those of EXPERIMENT NO. 5.

TABLE 17

Effects of Residence Time at Each of Three Temperature Levels on
Purification of Agricultural Grade Phosphoric Acid by Furnacing a
Mixture of Pine Sawdust and the Phosphoric Acid Fixed variables:
133.1 g d.b. pine sawdust
279.4 g d.b. phosphoric acid (100% $H_3PO_4$ basis)
412.5 g d.b. mixture charge
2.10 acid-sawdust ratio, d.b.
77.3% $H_3PO_4$, 1.065% $Fe_2O_3$ = 1.38% $Fe_2O_3$ in 100% $H_3PO_4$ basis

| Hold time, min. | 10 | 20 | 40 | 80 | 10 | 20 | 80 | 10 | 40 | 81 |
|---|---|---|---|---|---|---|---|---|---|---|
| Pot temp., °C. | 374 | 373 | 373 | 376 | 412 | 412 | 411 | 509 | 518 | 516 |
| Run No. | 40 | 46 | 43 | 45 | 38 | 47 | 44 | 36 | 60 | 63 |
| Time/plastic, min. | 13 | 14 | 13 | 13 | 14 | 15 | 14 | 14 | 15 | 15 |
| Ttl. ht. time, min. | 26 | 42 | 59 | 99 | 32 | 42 | 108 | 40 | 75 | 156 |
| Wt. Furance Prod. g | 349.7 | 314.7 | 307.2 | 302.7 | 315.1 | 309.0 | 286.2 | 296.1 | 268.1 | 263.8 |
| Yd. F.P. from mix % | 84.8 | 76.3 | 74.5 | 73.4 | 76.4 | 74.9 | 69.4 | 71.8 | 65.0 | 64.0 |
| Conc. Recovered Acid | | | | | | | | | | |
| Weight, g. | 270.4 | 255.3 | 263.4 | 258.1 | 254.0 | 254.8 | 267.9 | 254.7 | 233.1 | 249.0 |
| % $H_3PO_4$ | 71.3 | 73.35 | 73.6 | 72.35 | 72.75 | 73.0 | 69.45 | 69.6 | 73.1 | 72.0 |
| Wt. 100% $H_3PO_4$ | 192.7 | 187.3 | 193.9 | 186.7 | 184.8 | 186.0 | 186.1 | 177.3 | 170.4 | 181.9 |

TABLE 17-continued

Effects of Residence Time at Each of Three Temperature Levels on
Purification of Agricultural Grade Phosphoric Acid by Furnacing a
Mixture of Pine Sawdust and the Phosphoric Acid

| | | | | | | | | | | |
|---|---|---|---|---|---|---|---|---|---|---|
| Yd. $H_3PO_4$ | 69.0 | 67.0 | 69.4 | 66.8 | 66.1 | 66.6 | 66.6 | 63.4 | 61.0 | 65.1 |
| % $Fe_2O_3$ | 0.186 | 0.152 | 0.128 | 0.089 | 0.153 | 0.135 | 0.063 | 0.108 | 0.102 | 0.083 |
| % $Fe_2O_3$ in 100% $H_3PO_4$ | 0.261 | 0.207 | 0.174 | 0.123 | 0.210 | 0.185 | 0.091 | 0.155 | 0.140 | 0.114 |
| % $Fe_2O_3$ Removed | 81.1 | 85.0 | 87.4 | 91.1 | 84.8 | 86.6 | 93.4 | 88.8 | 89.9 | 91.7 |

Figure 4:
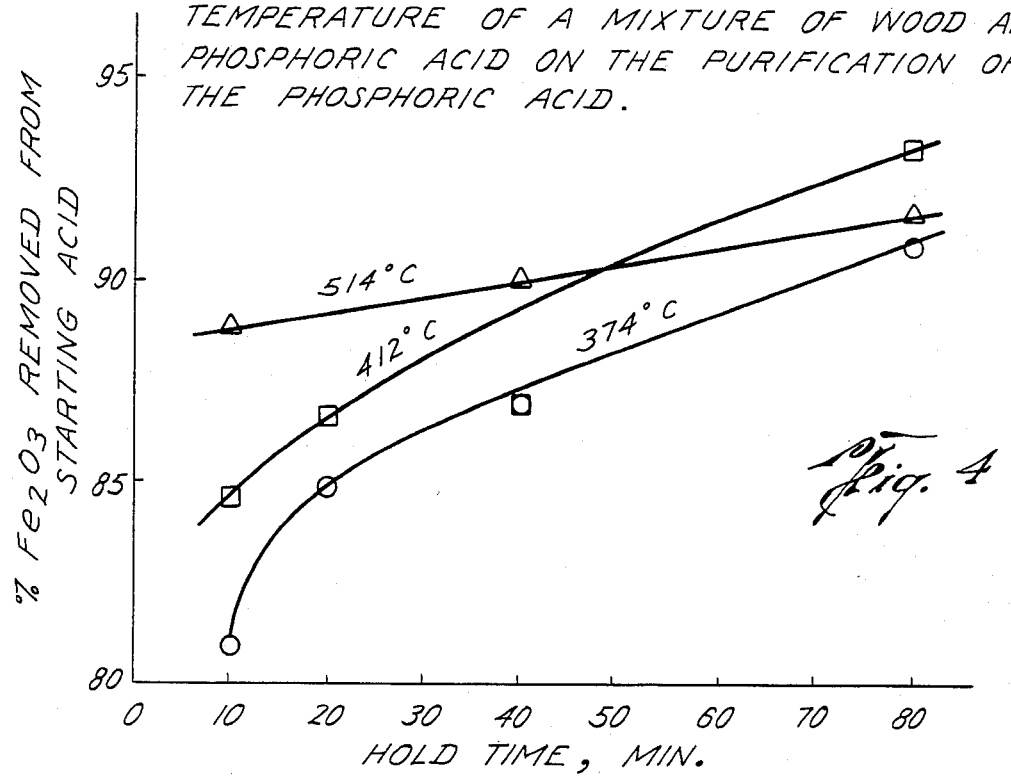
FIG. 4 is a graph of the effect of hold time at a furnacing temperature of an acid/wood mixture on the purification of the phosphoric acid.

Although not large, there is a definite effect of residence time at a given temperature level during pyrolysis of the impure acid and sawdust mixture. The extent of purification (as measured by iron removal from starting acid) increases as residence time increases as shown in the plots of FIG. 4. Also, as the plots show, the effect of residence time is somewhat less as the temperature increases; the effect is only slight at 514° C. (average temperature of the three runs) but is much more apparent at 374° C. average temperature.

There is also a general decrease in furnace product yield as residence time increases for all temperature levels. No doubt this same trend would be more apparent for phosphoric acid yield from starting acid if the furnace products were exhaustively extracted to recover the maximum amount of phosphoric acid. The decrease in yield is believed due to the aforementioned reaction between phosphoric acid and the carbonaceous material during furnacing.

Thus, residence time is not a primary variable in the process of furnacing a mixture of phosphoric acid and carbonaceous matter for the purpose of purifying the acid. The effect is easily compensated by slight adjustment of a major variable such as the ratio of acid to carbonaceous matter. In actual practice only a few minutes residence time is sufficient provided the mixture is at the uniform and proper temperature just before discharge from the furnace. Therefore, a drop or cascade type furnace is suitable for this process as illustrated in FIG. 1. In fact, a short residence time is desirable for another reason besides increased throughput; if the furnace product yield is plotted (not shown) as a function of hold time in the furnace, it is clear that residence time more adversely affects yield than it affects acid purification. Thus, to avoid excess scrubbing equipment to collect the hydrolyzed volatile phosphoric acid-esters, residence time should be kept to a minimum to minimize volatilization or phosphoric acid.

EXPERIMENT NO. 7 CARBONACEOUS RAW MATERIALS

Various carbonaceous raw materials were investigated for their suitability in the process of purifying phosphoric acid. The agricultural grade phosphoric acid from Freeport Chemical Company used previously was used throughout the investigation. Equipment and procedures were the same as those described for EXPERIMENT NO. 5 and for EXPERIMENT NO. 6. Results are given in TABLE 18.

TABLE 18

Evaluation of Carbonaceous Raw Materials in the Process
of Purifying Low-Grade Phosphoric Acid by Pyrolyzing a
Mixture of the Carbonaceous Material and the Acid

| | Pine Sawdust | | Hardwood | Bagasse | Cotton | Wood Char |
|---|---|---|---|---|---|---|
| | Untreated | Washed | | | | |
| Run No. | 59 | 70 | 17 | 52 | 27 | 53 |
| Carbonaceous Matter (CM) | | | | | | |
| Moisture (oven), % | 10.3 | dried | 11.25 | 21.5 | — | 23.4 |
| Charge Weight, g. | 148.4 | 133.1 | 100.0 | 200.0 | 150.0 | 100.0 |
| Dry basis, g. | 133.1 | 133.1 | 88.75 | 157.0 | — | 76.6 |
| Freeport Chemical Acid | | | | | | |
| % $H_3PO_4$ | 77.3 | 77.3 | 77.7 | 77.3 | 77.7 | 77.3 |
| % $Fe_2O_3$ in 100% $H_3PO_4$ basis | 1.38 | 1.38 | 1.84 | 1.38 | 1.84 | 1.38 |
| Charge weight, g. | 361.4 | 361.6 | 250.0 | 426.5 | 375.0 | 160.9 |
| 100% $H_3PO_4$ basis, g. | 279.4 | 279.4 | 194.25 | 329.7 | 291.4 | 124.4 |
| Weight d.b. mix., g. | 412.5 | 412.6 | 283.0 | 486.7 | 441.4 | 201.0 |
| Ratio acid to CM, d.b. | 2.10 | 2.10 | 2.19 | 2.10 | 1.94 | 1.62 |
| Time end plastic., min. 15 | 14 | 14 | 39 | — | — | |
| Ttl. heat time., min. | 77 | 77 | 52 | 71 | 98 | 75 |
| Temp., °C. | 513 | 514 | 500 | 511 | 510 | 512 |
| Time final temp., min. | 40 | 40 | 15 | 20 | 14 | 20 |
| Wt. furnace prod., g. | 276.1 | 295.4 | 198.1 | 321.2 | 233.2 | 138.1 |
| Yd F.P. from mix., d.b. % | 66.9 | 71.6 | 70.0 | 66.0 | 52.8 | 68.7 |
| Concentrated Recovered Acid | | | | | | |
| Weight, g. | 232.1 | 240.4 | — | 257.8 | 131.1 | 99.8 |
| % $H_3PO_4$ | 73.4 | 74.2 | 59.3 | 69.1 | 70.7 | 70.45 |
| Wt. 100% $H_3PO_4$ | 170.4 | 178.4 | | 178.1 | 92.7 | 70.3 |
| Yd., d.b., % | 61.0 | 63.8 | — | 54.0 | 33.2 | 56.5 |
| % $Fe_2O_3$ | 0.103 | 0.094 | 0.066 | 0.138 | 0.087 | 0.1935 |
| % $Fe_2O_3$ 100% $H_3PO_4$ basis | 0.140 | 0.127 | 0.111 | 0.200 | 0.123 | 0.275 |
| % $Fe_2O_3$ removed from acid | 89.9 | 90.8 | 94.0 | 85.5 | 93.3 | 80.0 |
| Other Constituents in conc. | | | | | | |

TABLE 18-continued

Evaluation of Carbonaceous Raw Materials in the Process of Purifying Low-Grade Phosphoric Acid by Pyrolyzing a Mixture of the Carbonaceous Material and the Acid

| | Pine Sawdust | | Hardwood | Bagasse | Cotton | Wood Char |
|---|---|---|---|---|---|---|
| | Untreated | Washed | | | | |
| recovered acid | | | | | | |
| CaO, % | 0.062 | 0.018 | — | — | — | — |
| $K_2O$, % | 0.0224 | 0.0006 | — | — | — | — |
| $Na_2O$, % | 0.059 | 0.047 | — | — | — | — |
| 100% $H_3PO_4$ basis | | | | | | |
| CaO, % | 0.084 | 0.024 | — | — | — | — |
| $K_2O$, % | 0.031 | 0.0008 | — | — | — | — |
| $Na_2O$, % | 0.080 | 0.063 | — | — | — | — |

The mixed hardwood sawdust and hardwood wood shavings have been described previously in EXPERIMENT NO. 1. The pine sawdust from kiln dried lumber produced by a local wood mill also has been described previously.

In addition, a batch of the pine wood sawdust was acid digested to determine if the inorganic material in the pine wood contributed to the purity of the recovered phosphoric acid; wood ash is generally high in potassium. A portion of the pine sawdust was digested with 5% by weight hydrochloric acid at room temperature overnight with mechanical stirring. The digested sawdust was then washed three successive times using distilled water with double filtration for each wash in a Büchner funnel using Whatman No. 1 filter paper. The wet sawdust was dried for at least 24 hours in an 80° C. oven. It was then weighed and mixed with preweighed phosphoric acid and heated in the customary manner as already described.

The bagasse was obtained from the Rio Grande Valley Growers, Inc., Santa Rosa, Texas. The bagasse was from run-of-plant stock which had been dried and pulverized. For this reason the material was light and fluffy, and proved difficult to wet with the agricultural grade phosphoric acid. Therefore, approximately equal portions of about 1 liter of tap water were added intermittently to the bagasse during mixing to facilitate wetting and permeation of the acid into the bagasse. The mixture was also kneaded thoroughly by direct hand contact to aid dispersion. A strong odor of hydrogen sulfide was noted on addition of the acid and the odor persisted throughout mixing. Due to the water addition, the time to complete the plastic stage was prolonged. After mixing in the pot and during initial heating through the plastic stage, the mixture was of a lumpy, stringy character and was difficult to stir. Thus, portions of the bed were lifted (gouged) from the bottom of the graphite pot in order to achieve even contact of all portions of the bed with the hot walls of the graphite pot. The mixture did not display a well defined plastic stage (as compared to wood), although some material tended to stick to the hot walls of the pot. Initially the bed was very bulky but it shrank considerably as the material blackened and charred. The final bed volume, however, was comparable to that of the charred wood-acid mixtures and in this form, no difficulty was encountered in stirring the granular, free-flowing material.

Cotton was investigated because it is pure cellulose; cellulose being part of the structure of woods and believed to have a significant role in the process described herein. Cotton was obtained in the form of batting used in stuffing or quilt linings. This material also provided difficult to wet due to its bulkiness. Thus, as with bagasse, approximately equal portions of about 1 liter of tap water were added intermittently to the acid-cotton mixture, and the mixture was kneaded by hand. A long time was required to complete the plastic stage due to the necessity for evaporation of the excess water. A stirring technique similar to that used with bagasse was employed. After initial frothing, the bed shrank considerably and a pronounced plastic stage was observed. A considerable portion of the cotton mixture appeared to dissolve, yielding a "soupy", black semi-liquid. This plastic stage was much more pronounced than that observed with wood-acid mixtures even those wood-acid mixtures with a high acid-to-wood ratio. The semi-liquid state gradually solidified during continuous dehydration to give granular, free-flowing agglomerates at the final portion of the plastic stage. The granulated cotton char was allowed to set for 1½ hours before furnacing was resumed to the final stage. Upon close examination of the furnace product, a portion, although black and charred, had the texture and fluffiness of the original cotton. Thus, an estimated 10% of the original cotton had not been permeated by the acid.

A sample of wood char was also included as a wood-derived material. The wood char was derived from hardwood and obtained from a local charring operation. The carbon residue may be recycled to constitute a portion of the carbonaceous-acid mixture and this practice constitutes a feature of this invention. The carbon residue may be added during any part of the mixing process, either initially with only the acid, followed then by carbonaceous matter addition at the main mixing station, or with, the carbonaceous matter at the mixing station or finally after the mixing of acid and carbonaceous matter. Alternatively, the carbon residue alone could be added to the acid at the mixing station.

The results in TABLE 18 indicate that hardwood and cotton (cellulose) are comparable in removing a large amount of impurities from the agricultural grade acid. The next most efficient, impurity reducing carbonaceous material is pine sawdust. Considerably less percentage of calcium and potassium are present in the recovered concentrated phosphoric acid from the acid washed pine sawdust acid material than are present from the untreated pine sawdust-acid mixture. Sodium content was about the same for both pine sawdust samples. The bagasse-acid mixture resulted in an 85.5% $Fe_2O_3$ removal, while the char-acid mixture resulted in an 80.0% $Fe_2O_3$ removal.

In part of this experiment, washed pine sawdust was used in order to determine the effect of ridding the pine sawdust of its alkali and alkaline earth content before contact with the phosphoric acid, even though the alkali and alkaline earth materials are present only in small amounts in the pine sawdust. However, the alkali and alkaline earth content can be easily removed by a suitable cation-exchange resin applied to the dilute phosphoric acid subsequent to water extration. A Zeolite sodium ion exchanger, for example, would be suitable for use in a plant process, since sodium is innocuous in most applications, including the detergent industry which uses sodium tripolyphosphate made from phosphoric acid. The resulting acid is of such a high percent purity so as to be available for successful production of sodium tripolyphosphate.

EXPERIMENT NO. 8 WATER EXTRACTION OF FURNACE PRODUCT

A batch of furnace product was prepared using equipment and procedures previously described except that twice the quantity of agricultural grade phosphoric acid from Freeport Chemical Company as well as twice the quantity of pine sawdust were used. The increased amounts were used to insure an adequate supply of furnace product for testing during washing and further treatments. Furnacing data are furnished in TABLE 19.

TABLE 19

Furnacing a Mixture of Pine Sawdust and Agricultural Grade Phosphoric Acid to Prepare Furnace Product for Use in Washing Studies

| Run 64 | |
|---|---|
| Pine sawdust | |
| Moisture, % | 10.3 |
| Charge weight, g. | 296.8 |
| Dry basis, g. | 266.2 |
| Phosphoric acid | |
| % $H_3PO_4$ | 77.3 |
| Charge weight, g. | 722.8 |
| Dry basis, g. | 558.7 |
| Weight mixture, d.b., g. | 824.9 |
| Ratio acid to sawdust, d.b. | 2.10 |
| Time to complete plastic stage, min. | 18 |
| Total heating time, min. | 84 |
| Temperature, °C. | 515 |
| Time at final temp., min. | 40 |
| Weight furnace product, g. | 594.6 |
| Yield F.P. from d.b. mixture, % | 72.1 |

Washing of furnace product followed the same procedure as that used heretofore except that boiling distilled water was used. The hot water was added to the furnace product through a Büchner funnel and Whatman No. 1 filter paper. The hot water was allowed to stand in contact with the furnace product for five minutes before it was drained under vacuum. For the first extraction only, the filtrate was filtered again through the solid furnace product. The second extraction followed the first extraction by another boiling water addition to the once-extracted furnace product, which was allowed to stand for five minutes as before, and then drained under vacuum. Double filtration was not done for the second or subsequent extractions. Ten separate extractions were performed, and each time the weight of water was measured as well as the weight and volume of each filtrate. A weighed portion of each filtrate was titrated with standardized 0.5N caustic solution to the second equivalence point using phenolpthalein indicator to determine the percent phosphoric acid in each water extract. Results are given in TABLE 20.

TABLE 20

Hot Distilled Water Extraction of Furnace Product

Furnace Product for washing = 275.0 g.

Weight starting acid charge to furnace = $\frac{275.0(558.7 \text{ g})}{594.6}$
= 258.4 g 100% $H_3PO_4$

| Wash Stage, n | Weight Water, g. | Water Extract Weight, g. | Volume, ml | % $H_3PO_4$ | Wt. $H_3PO_4$ Recovered |
|---|---|---|---|---|---|
| 1 | 358.4 | 314.0 | 243 | 42.5 | 133.45 |
| 2 | 241.5 | 253.2 | 233 | 14.1 | 35.70 |
| 3 | 241.6 | 233.4 | 228 | 5.05 | 11.79 |
| 4 | 241.5 | 232.3 | 231 | 1.83 | 4.26 |
| 5 | 241.5 | 219.6 | 219 | 0.763 | 1.68 |
| 6 | 241.5 | 225.7 | — | 0.321 | 0.724 |
| 7 | 241.5 | 225.6 | — | 0.143 | 0.323 |
| 8 | 241.5 | 224.9 | — | 0.0702 | 0.158 |
| 9 | 241.5 | 220.9 | — | 0.0506 | 0.112 |
| 10 | 241.5 | 224.5 | — | 0.0276 | 0.0620 |
| Total | 2532.0 | 2374.1 | — | — | 188.259 |

Weight wet washed product = 224.7 g.
Weight dried washed product = 111.7 g.
Weight residual liquor in F.P. = 224.7 g. − 111.7 = 113.0 g.
Corrected weight 10th filtrate = 224.5 g. + 113.0 = 337.5 g.
Corrected weight total filtrate = 2374.1 g. + 113.0 = 2487.1 g.
Corrected weight $H_3PO_4$ (100%) in 10th extract =
0.0620 g + 113.0 g(0.000276)
= 0.0620 g + 0.0312 = 0.0932 g.
Corrected total weight $H_3PO_4$ (100%) recovered =
188.259 + 0.0932 = 188.352 g.
Weight loss F.P from extractions = 275.0 g − 111.7 = 163.3 g.
% $H_3PO_4$ in initial F.P. = 188.4 g/163.3 g. = 115.4%
Efficiency of $H_3PO_4$ recovery = 188.4 g/258.4 g = 72.9%

Figure 5:
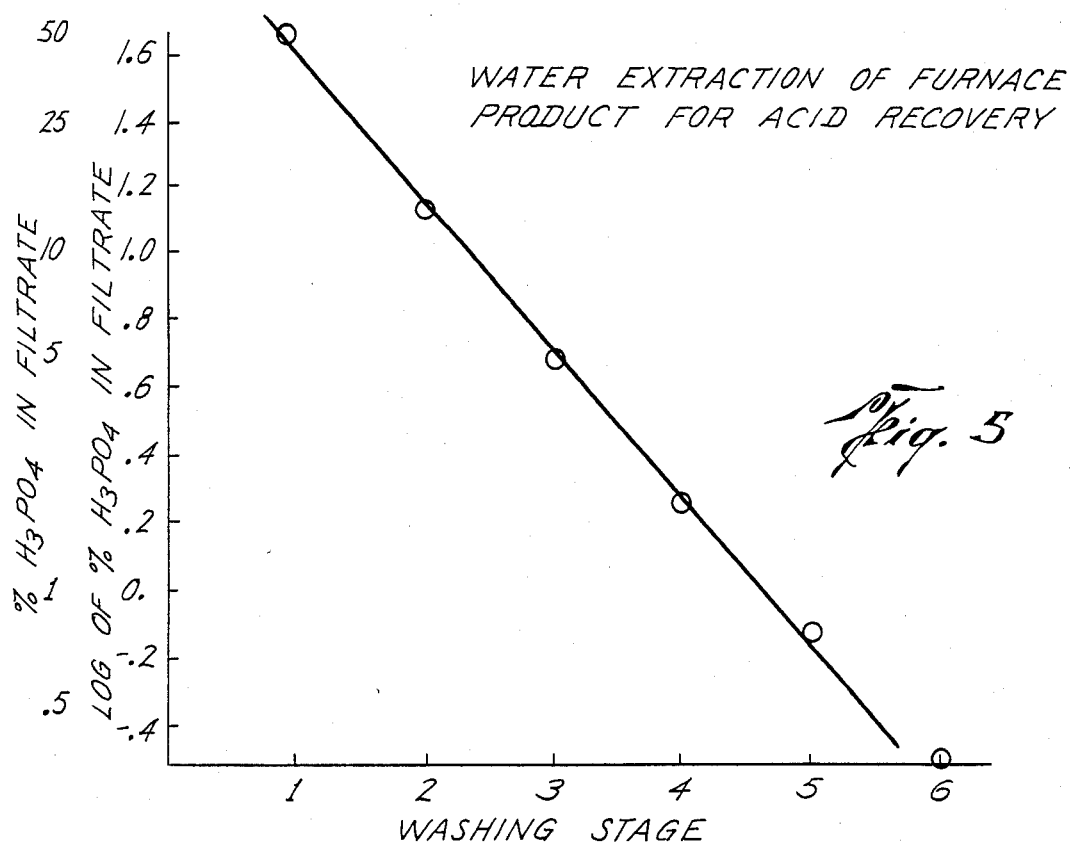
FIG. 5 is a graph of the percent phosphoric acid removed at subsequent washing stages.

FIG. 5 gives a plot of percent phosphoric acid as a function of the number of extraction cycles for six cycles of extractions. This curve fits the logarithmic function for percent phosphoric acid as it should if the extraction phenomenon was merely dissolution of solute (phosphoric acid).

Recovery efficiency for phosphoric acid is only 73% by water extraction alone. Part of the original acid is lost in furnacing (volatilization), amounting to 6% at the temperature employed for this experiment. The 6% volatile loss is completely recoverable on a plant scale by water scrubbing.

EXPERIMENT NO. 9 FURNACING TEMPERATURE EFFECTS ON RECOVERY OF PHOSPHORIC ACID

This experiment is one of several to investigate the effects of temperature during furnacing a mixture of pine sawdust and agricultural grade phosphoric acid on the recovery of acid from the residue. Freeport Chemical Co. merchant grade (agricultural grade) acid was used. This mixture was furnaced through the plastic stage, the hot product allowed to cool, weighed, and a portion removed for water extraction. No hold-time at any given temperature was practiced during the plastic stage. The mixture was stirred continuously while heating until the material became granular and free-flowing, then heating was stopped and the contents allowed to cool.

After withdrawing a portion, the balance of the plastic stage product was returned to the furnace and heated to a final temperature of 550° C. as measured by a thermocouple at the center of and within the base of the graphite pot. Heat was regulated to maintain the temperature at 510° C. for 10 minutes when the heat source was stopped. Then exactly the same procedure was followed as was done for the plastic stage product. After cooling, weighing, and withdrawing a portion for water extraction, the balance of the product was returned to the furnace.

For the third furnacing step, the temperature was maintained for 10 minutes at 720° C., then the same procedure was repeated except that a fourth furnacing step was not done.

Results are given in TABLE 21. Charge weights and product weights have been corrected for sample withdrawals between the furnacing stages.

TABLE 21
Three Stage Furnacing at Different Temperature Levels

Initial Furnace Charge:
| | |
|---|---|
| Weight Pine sawdust, dry basis, g | = 266.2 |
| Weight 77.3% H$_3$PO$_4$, g | = 723.2 |
| as 100% H$_3$PO$_4$, g | = 559.0 |
| Total weight d.b. mixture | = 825.2 |
| Acid/sawdust ratio, d.b. | = 2.10 |

| | Run No. | | |
|---|---|---|---|
| | 87 | 88 | 89 |
| | Temp., °C. | | |
| | 320(max) | 509 | 721 |
| Charge weight, actual, g | 825.2 | 519.2 | 208.9 |
| Adjusted for sample removal, g | 825.2 | 779.0 | 627.0 |
| Time to complete plastic stage, min. | 19 | — | — |
| Heating rate to final temp., °C./min. | 15.3 | 13.3 | 11.1 |
| Hold time at final temp., min. | 0 | 10 | 10 |
| Average final temp., °C. | 320 | 509 | 721 |
| Weight furnace product, actual, g | 779.0 | 417.9 | 142.4 |
| Adjusted for sample removals, g | 779.0 | 627.0 | 427.4 |
| Yield final product (F.P.) from charge, % | 94.4 | 80.5 | 68.2 |
| from starting mixture, d.b., % | 94.4 | 76.0 | 51.8 |
| F.P. tamped density, g/ml | 0.670 | 0.740 | 0.778 |

A portion of each furnace product was batch washed with boiling hot distilled water. The preweighed water was added just sufficient to cover the furnace product supported by one circle of Whatman No. 5 filter paper on a Büchner funnel. Water was allowed to contact the product for 5 minutes before applying suction to collect filtrate. A second filtration was done for each extraction; that is, the filtrate was poured onto the product and recollected a second time. Thus, two filtrations were made for each extraction. The wet filter cake was dried 24 hours or more in a 90° C. forced-draft oven. Also, the filtrates for each run were combined, weighed, then refiltered and concentrated on a hot plate. The concentrated filtrate was measured for percentage H$_3$PO$_4$ (titrimetric) and for percentage iron (atomic absorption). Results are given in TABLE 22. Note that the product becomes more dense as the temperature is increased. Also, product yield linearly decreases with increasing temperature.

TABLE 22
Water Extraction of Furnace Product

| Extraction Stage | Weight Water, g | Water Extract | | |
|---|---|---|---|---|
| | | Weight, g | Volume, ml | density, g/ml |
| Run 87 F.P. = 130.3 g | | | | |
| 1 | 250.0 | 241.7 | 207 | 1.168 |
| 2 | 145.0 | 150.1 | 141 | 1.064 |
| 3 | 145.1 | 139.7 | 137 | 1.020 |
| 4 | 145.0 | 140.6 | 140 | 1.004 |
| 5 | 145.0 | 132.2 | 133 | 1.002 |
| 6 | 145.0 | 134.2 | 134 | 1.001 |
| Total | 975.1 | 939.5 | 892 | 1.053 (Avg.) |
| Run 88 F.P. = 130.1 g | | | | |
| 1 | 200.0 | 213.8 | 179 | 1.194 |
| 2 | 145.0 | 142.0 | 134 | 1.060 |
| 3 | 145.2 | 136.8 | 134 | 0.021 |
| 4 | 145.2 | 138.3 | 137 | 1.009 |
| 5 | 145.0 | 131.3 | 131 | 1.002 |
| 6 | 145.0 | 133.0 | 133 | 1.000 |
| 7 | 145.0 | 130.9 | 131 | 0.999 |
| Total | 1070.2 | 1026.1 | 979 | 1.048 (Avg.) |
| Run 89 F.P. = 129.5 g | | | | |
| 1 | 234.8 | 233.4 | 204 | 1.144 |
| 2 | 145.2 | 138.5 | 132 | 1.049 |
| 3 | 145.0 | 133.5 | 130 | 1.027 |
| 4 | 145.0 | 135.2 | 134 | 1.009 |
| 5 | 145.0 | 131.6 | 131 | 1.005 |
| 6 | 145.0 | 132.5 | 132 | 1.004 |
| Total | 960 | 904.7 | 863 | 1.048 (Avg.) |

Products

| | Run No. | | |
|---|---|---|---|
| | 87 | 88 | 89 |
| Weight wet washed product, g | 103.1 | 109.7 | 110.1 |
| Weight dry washed product, g | 29.1 | 47.1 | 55.5 |
| % Water in wet washed product | 71.8 | 57.1 | 49.6 |
| Corrected weight total filtrate, g | 1013.5 | 1088.7 | 959.3 |
| Corrected volume total filtrate, ml | 966 | 1042 | 918 |
| Density of filtrate (Avg.), g/ml | 1.049 | 1.045 | 1.045 |
| Product Weights Calculated to Original Mixture Basis | | | |
| Weight furnace product for washing, g | 779.0 | 627.0 | 427.4 |
| Weight dry washed product, g | 174.0 | 227.0 | 183.1 |
| Yield dry washed product, % | | | |
| from furnace product | 22.3 | 36.2 | 42.8 |
| from furnace charge | 21.1 | 29.1 | 29.2 |
| from starting d.b. mixture | 21.1 | 27.5 | 22.2 |
| Total weight water for extractions, | 5830 | 5158 | 3168 |
| Weight water per g. F.P. | 7.48 | 8.23 | 7.41 |
| Corrected weight total filtrate, g | 6059 | 5247 | 3166 |
| Corrected volume total filtrate, ml | 5775 | 5022 | 3030 |
| Avg. corrected density of filtrate, g/ml | 1.049 | 1.045 | 1.045 |
| Concentration and Analysis of Filtrate | | | |
| Weight concentrated water extract, | 5352 | 4078 | 858 |
| Analysis | | | |
| % H$_3$PO$_4$ (titration) | 9.60 | 9.96 | 28.2 |
| % Fe$_2$O$_3$ (AA) | 0.1418 | 0.0210 | 0.1737 |
| % Fe$_2$O$_3$ (100% H$_3$PO$_4$ basis) | 1.48 | 0.211 | 0.616 |
| Weight (100% H$_3$PO$_4$) recovered acid, g | 513.8 | 406.2 | 241.9 |
| Yield recovered acid from starting acid, % | 91.9 | 72.7 | 43.3 |
| *% Fe$_2$O$_3$ removed from starting acid | 1.3 | 85.9 | 58.9 |

*Fe$_2$O$_3$ in starting acid (100% H$_3$PO$_4$ basis) = 1.50%

The percentage water in the filter cake (wet washed product) is taken as an estimate of the total pore volume of the solid. Note that the percentage water decreases with increasing heat treatment temperature. In this connection, the yield of dry washed solid from furnace product (charge for washing) increases with increasing temperature. On the other hand, if yields are calculated on the basis of initial dry basis charge (pine sawdust and raw acid mixture) a maximum is observed. In this connection, the yield of recovered acid from starting acid decreases with increasing heat treatment temperature. As will be made more apparent momentarily these effects are due to both shrinkage of the char residue (decreasing total pore volume) and increasing volatilization of phosphoric acid as the heat treatment temperature is increased.

Each of the furnace products was analyzed for total phosphorous. Each was ground in a mortar and pestle, weighed into a nickel crucible with excess lithium carbonate as a fluxing agent, then fused over a Meker burner to cherry-red temperature (about 900° C.). This procedure proved somewhat uncertain due to moisture picked up during grinding, although attempts were made to correct for the weight gain. The melt was dissolved in hydrochloric acid, then the solution was filtered and weighed. Washed insolubles in the solution were fired over a Meker burner and weighed. The ash residue was found to be slight and was ignored. Aliquots were taken from the solution for the colorimetric determination of phosphorous by measuring light absorbance at 470, 420 or 400 (depending on color intensity) nm wavelength of the phospho-vanado-molybdate complex (yellow) and comparing the results to a calibration curve. Results are given in TABLE 23.

TABLE 23

| Analysis of Furnace Product for Phosphorous | | | |
|---|---|---|---|
|  | 87 | 88 | 89 |
| Furnace product, g | 779.0 | 627.0 | 427.4 |
| P as $H_3PO_4$ in furnace product, % | 71.8 | 78.7 | 73.0 |
| weight, g | 559.3 | 493.4 | 311.9 |
| Yield from starting acid, % | 100 | 88.3 | 55.8 |
| Yield recovered $H_3PO_4$ from starting $H_3PO_4$, % | 92.1 | 72.7 | 18.6 |
| $H_3PO_4$ furnace volatilization loss, % | 0 | 11.3 | 44.2 |

From these data, as the heat-treatment temperature increases the yield of phosphorous (calculated as $H_3PO_4$) in the final product decreases, especially at the highest temperature employed. The same is true for the recovered water extracted acid. As the heat-treatment temperature increases, the availability of acid for water-extraction decreases, i.e., the acid appears to be more tenaciously bonded to the char matrix for furnace products heated to higher temperatures. The plastic stage product retains only a relatively small amount of phosphoric acid compared to the other two products; purification of the starting acid is also slight (TABLE 21). Volatilization of phosphoric acid increases with increasing heat treatment. Part of this loss is due to a slow heating rate (TABLE 21) and hold-time at the final temperature (10 minutes for each heat treatment). Thus, as mentioned earlier, heating rates should be high and hold-time kept to a minimum beyond the plastic stage and cascade-type furnace (FIG. 1) is ideally suited to these criteria.

EXPERIMENT NO. 10 WATER EXTRACTION IN A COLUMN

For ease of operation on a plant scale, water-extraction of furnace product contained in a column was considered. For this purpose, another furnace product preparation was made using pine sawdust mixed thoroughly with agricultural grade phosphoric acid from Freeport Chemical Co. The $H_3PO_4$ in the acid measured 77.3% by titration. Heat treatment data are furnished below (TABLE 24).

TABLE 24

| Heat Treatment of Pine Sawdust Mixed with Agricultural Grade Phosphoric Acid (Freeport) | |
|---|---|
|  | Run 90 |
| Charge | |
| Weight pine sawdust, dry basis, g | 266.2 |
| Weight phosphoric acid (100% $H_3PO_4$ basis) | 559.0 |
| Weight mixture, g d.b. | 825.2 |

TABLE 24-continued

| Heat Treatment of Pine Sawdust Mixed with Agricultural Grade Phosphoric Acid (Freeport) | |
|---|---|
|  | Run 90 |
| Ratio acid to sawdust, d.b. | 2.10 |
| Heat Treatment | |
| Time to complete plastic stage, min. | 10 |
| Heating rate to final temperature, °C./min. | 7.72 |
| Avg. final temperature, °C. | 552 |
| Hold time at final temperature, min. | 10 |
| Furnace Product weight, g | 577.8 |
| Yield from charge, % | 70.0 |
| Tamped density, g/ml | 0.679 |
| % P as $H_3PO_4$ in final product | 90.7 |
| Weight $H_3PO_4$, g | 524.3 |
| % of starting acid | 93.8 |
| % $H_3PO_4$ Volatilized during heating (by diff.) | 6.2 |

After sampling, the balance of furnace product (563.6 g) was charged to a 5.0 cm bore, 1000 ml burette filled with glass wool at its bottom overlaid with a circular 316 S.S. 100 mesh screen. After tapping the burette to allow the product to settle, the bed height measured 32.9 cm. Tap water was slowly admitted through the stopcock and it was quickly learned that up-flow extraction could not be done due to the high density of the acid extractant which caused particles to float. Therefore, down-flow washing was practiced and the opportunity was taken to measure percolation rates, useful in designing equipment for counter-current operations. Pre-weighed boiling-hot distilled water was added at the top of the column and was allowed to drain into a cylinder while taking volume measurements of effluent with time. Results are given in TABLE 25.

TABLE 25

| Water Extraction of Furnace Product | | | | |
|---|---|---|---|---|
| Run 90 | | | | |
| Column diameter = | 5.0 cm. | | | |
| Bed height = | 32.9 cm. | | | |
| Weight of charge = | 563.6 g | | | |
| Bed volume = | 830.0 ml | | | |
| Wetting Test | | | | |
| 250.0 g water added | | | | |
| 1st effluent appeared in 50 sec. | | | | |
| Bed permeation = 32.9 cm/50 sec = 0.658 cm/sec | | | | |
| Column effluent = 184.8 g, 104 ml | | | | |
| Percolation Tests | | | | |
|  | Water | Column effluent | | |
| Stage | Influent | g | ml | d, g/ml |
| 1 | 250.0 | 184.8 | 104 | 1.777 |
| 2 | 310.1 | 308.2 | 213.5 | 1.444 |
| 3 | 343.1 | 290.9 | 217 | 1.340 |
| 4 | 324.5 | 379.2 | — | — |
| 5 | 258.0 | 712.1 | 565 | 1.260 |
| Total | 1485.7 | 1875.2 | | |

The water level was measured as a function of time and a plot of typical results are given in FIG. 6 from whence the linear percolation rate through the bed is 0.212 cm/g.

Following the percolation tests, the solid residue in the column was removed and further extracted with water by filtration on Whatman No. 5 filter paper on a Büchner funnel as described earlier. Because the results closely agreed with those presented earlier in TABLES 20 and 22 only the totals (including those from the percolation test) are given below. Also, results are calculated in terms of the original furnace product weights.

TABLE 26

Water Extraction of Furnace Product

Weight furnace product = 577.8

| | Washing Weight Water, g | Effluent Liquor Weight, g | Effluent Liquor Volume, ml | Effluent Liquor Density, g/ml |
|---|---|---|---|---|
| Total from percolation test | 765.4 | 1269.9 | 1099 | 1.156 |
| Total 5-stage batch extraction | 2500.7 | 2666.1 | 2622 | 1.017 |
| Grand total | 3267 | 3936 | 3721 | 1.058(Avg.) |

Solids

| | |
|---|---|
| Ratio weights $H_2O$/F.P. | 5.65 |
| Weight wet residue, g | 477.6 |
| Water in wet solid, % | 54.9 |
| Weight dry solid residue, g | 215.4 |
| Yield from F.P., % | 37.3 |
| Yield from d.b. mixture, % | 26.1 |

Liquids

| | |
|---|---|
| Concentrated leachate weight, g | 503.9 |
| % $H_3PO_4$ (titration) | 83.65 |
| Weight 100% $H_3PO_4$, g | 421.5 |
| Yield from starting acid, % | 75.4 |

EXPERIMENT NO. 11 LEACHING THE WATER-WASHED PRODUCT WITH CAUSTIC FOLLOWED BY ACID TREATMENT

Much of the acid salts remaining in the water-washed product are leachable with bases such as caustic, potash or ammonia solutions. Too, the leachate should have value as a fertilizer despite the presence of at least some of the metallic impurities present in the original raw acid. Most of the impurities from agricultural grade phosphoric acid also have value as trace elements commonly lacking in commercial fertilizers.

Accordingly, several experiments were done to test the effects of leaching the water-washed products with bases followed by hydrochloric acid treatment as a separate stage. Batch treatments were employed as well as leaching in a column by both down-flow and up-flow of the leachate and subsequent water washes. Reagent grade chemicals as well as distilled water were used throughout. All products were derived from mixtures of agricultural grade phosphoric acid from Freeport Chemical Co. and pine sawdust.

The water washed products from three runs (TABLES 20, 22 and 25; runs 64, 89 and 90, respectively) were investigated for leachability of phosphoric acid salts remaining in the water washed products with caustic.

The first test with water washed products was done in beakers and used Run 90 product (TABLE 24). After digestion with hot (boiling) caustic solution on a hot plate for one hour, the digestion liquor was filtered through one circle of Whatman No. 5 filter paper supporting the digested solid in a Büchner funnel. This was followed by four separate water washes described earlier. Filtrates were titrated for caustic with standardized hydrochloric acid to an end point using methyl orange indicator. Results are given in TABLE 27.

TABLE 27

Caustic Digestion - Washing of Water-washed Furnace Product

Run 90
Weight dry water-washed product = 35.0 g
Caustic solution = 148.5 g, 9.53 g NaOH (6.42% NaOH)
Digestion time = 1 hour
Digestion temp. ≈ 100° C.

TABLE 27-continued

Caustic Digestion - Washing of Water-washed Furnace Product

Make-up water added intermittently

| | Weight Water, g | Filtrate wt. g | Filtrate vol, ml | Filtrate d, g/ml | Filtrate % NaOH | Weight NaOH, g |
|---|---|---|---|---|---|---|
| Digestion liquor | 139.0 | 69.4 | 62 | 1.119 | 1.80 | 2.67 |
| 1st water wash | 100.0 | 119.0 | 113 | 1.053 | 1.09 | 1.30 |
| 2nd water wash | 100.1 | 95.8 | 94 | 1.019 | 0.43 | 0.41 |
| 3rd water wash | 100.0 | 99.1 | 99 | 1.001 | 0.18 | 0.18 |
| 4th water wash | 100.2 | 98.9 | 99 | 0.999 | 0.11 | 0.11 |
| From water in wet solid | | 42.1 | 42 | 0.999 | 0.11 | 0.11 |
| Total | 539.3 | 524.3 | 509 | 1.030 (Avg.) | 0.912 (Avg.) | 4.78 |

| | |
|---|---|
| Ratio water/product charge = | 15.4 |
| Weight wet solid = | 68.8 g |
| % $H_2O$ = | 61.2% |
| Weight dried solid = | 26.7 g |
| Yield dry solid | |
| from $H_2O$-washed product, d.b. = | 76.3% |
| from furnace product = | 28.45% |
| from d.b. mixture = | 19.9% |
| Ash in dry product = | 17.2% |
| Free caustic remaining in dry solids = | 0.11 g |
| % of dry solid = | 0.41% |
| Caustic consumed = 9.53 g − 4.78 = | 4.75 g |

The percentage water retained in the wet solid filter cake is significantly greater than that of the water-washed product (61.2% vs 54.9%) as a result of greater pore volume in the solid due to removal of salts from the pores. Specific total pore volumes can easily be estimated assuming the density of water to be 1 g/ml; total pore volume for the former amounts to 1.22 ml/g and 1.58 ml/g for the latter. Still there remains appreciable material in the pores as indicated by the ash-value of dry product.

In an attempt to remove more of the ash, assuming most of the ash is phosphate salts, a hydrochloric acid digestion and washing was done on the dried product from the caustic digestion. Again a beaker (batch) process was used, the same as for the caustic digestion-washing and using the same procedure. Filtrate was titrated for HCl with standardized caustic to the methyl orange end point. Results are given in TABLE 28.

TABLE 28

Hydrochloric Acid Digestion-Washing of Caustic Digested-Washed Product

Run 90
Weight caustic-washed product = 20.6 g
HCl solution = 91.6 g, 4.55 g HCl (4.97% HCl)
Digestion time = 60 minutes
Digestion temperature ≃ 100° C. (boiling)
Make-up water added intermittently during digestion

| | Weight g | \multicolumn{5}{c}{Liquids Filtrate} | | | | |
|---|---|---|---|---|---|---|
| | Weight g | Weight, g | Vol., ml | Den. g/ml | % HCl | Wt. HCl, g |
| Digestion liquor | 102.8 | 69.9 | 67.5 | 1.036 | 1.71 | 1.20 |
| 1st water wash | 100.1 | 103.7 | 103.0 | 1.007 | | |
| 2nd water wash | 100.3 | 97.0 | 97.8 | 0.992 | | |
| 3rd water wash | 100.3 | 97.0 | 98.0 | 0.990 | 0.27 | 1.05 |
| 4th water wash | 100.0 | 96.1 | 96.8 | 0.993 | | |
| water in wet solid, g | | 29.1 | 28.9 | 0.993 | | |
| Total | 503.5 | 492.8 | 491.9 | 1.002 (Avg.) | 0.456 | 2.25 |

Solids

| | |
|---|---|
| Ratio weights H$_2$O/product charge | 24.4 |
| Weight wet solid, g | 46.5 |
| H$_2$O in wet solid, % | 62.6 |
| Weight dry solid, g | 17.4 |
| Yield dry solid, % | |
| from NaOH-washed product | 84.5 |
| from H$_2$O-washed product | 64.4 |
| from furnace product | 24.0 |
| from d.b. (dry basis) starting mixture | 16.8 |
| Ash in product, % | 6.58 |
| P as H$_3$PO$_4$ in dry solid product, % | 6.79 |
| as P$_2$O$_5$, % | 4.92 |
| Yield product from d.b. pine wood, % | 52.1 |
| based on ash-free product, % | 48.6 |

The percentage water (62.6%) in the wet filter cake is slightly greater than that of caustic digested product (61.2% H$_2$O) and considerably greater than that of water washed product (54.9% H$_2$O). From these values, the calculated specific total pore volumes are 1.67 ml/g, 1.58 and 1.22, respectively. This increase in pore volume is reflected in the reduction of ash from 17.2% to 6.6% for the first two products given. Thus, the hydrochloric acid digestion washing removed additional matter to increase pore volume.

The calculated ash-free yield from starting pine sawdust is surprisingly high at first glance. The ash in the dry base pine measures only 0.70% or 1.86 g for the pine charge. Most of this ash is soluble. Thus, the pine wood ash contributes only a very small amount to the ash of the HCl-washed product. In charring pine wood near 600° C. the char yield amounts to about 23% from dry basis wood. The high yield (48.6%) of the ash-free residue from charring wood in the presence of phosphoric acid can only mean that the acid retards the release of tar-volatiles and such materials remaining after furnacing are incorporated into the carbon structure of the residue to increase yield.

Another caustic digestion-washing followed by hydrochloric acid digestion-washing was done on the final portion of water-washed product. For the water-washing after caustic treatment a column was used in the down-flow mode. A 100 ml burette of 5.0 cm bore was packed with glass wool at its bottom then overlaid with a stainless steel, circular, 100 mesh screen to support the product.

The solid product was digested with caustic solution in a beaker on a hot plate before adding the slurry to the column. Results are given in TABLE 29.

TABLE 29

Caustic Digestion-Washing of Water-Washed Product in a Column

Weight water-washed product = 164.2 g
NaOH solution = 704.7 g, 45.1 g NaOH (6.40% NaOH)
Digestion time = 31 minutes
Temperature of digestion ≃ 100° C.

| | | Filtrate | | |
|---|---|---|---|---|
| | Weight Water, g | Weight, g | Volume, ml | $^a$Approximate Density, g/ml |
| Digest. liquor & washing | 659.6 | | | |
| water for solids transfer | 448.1 | 806.8 | 753 | 1.071 |
| 2nd water wash | 532.5 | 841.1 | 822 | 1.023 |
| 3rd water wash | 428.0 | 690.8 | 686 | 1.007 |
| 4th water wash | 440.8 | 350.6 | 349 | 1.004 |
| 5th water wash | 434.9 | 563.8 | 571 | 0.987 |
| 6th water wash | 439.2 | 395.6 | 400 | 0.989 |
| 7th water wash | 428.7 | 487.4 | 495 | 0.985 |
| 8th water wash | 443.2 | 444.4 | 450 | 0.988 |
| 9th water wash | 350.2 | 374.6 | 380 | 0.986 |
| 10th water wash | 427.5 | 426.1 | 430 | 0.991 |
| 11th water wash | 439.5 | 450.2 | 455 | 0.989 |
| 12th water wash | 352.2 | 383.5 | 385 | 0.996 |
| water in wet solid | . | 281.8 | 282 | 0.999 |
| Total | 5824.4 | 6496.7 | 6458 | 1.006 (Avg.) |

| | |
|---|---|
| Ratio water/product charge = | 35.5 |
| Weight wet solid = | 394.4 g |
| % H$_2$O in wet solid = | 71.45 g |
| Weight dry solid = | 112.6 g |
| Tamped density dry solid = | 0.264 g/ml |
| Yield dry solid from | |
| H$_2$O - washed product, % | 68.6 |
| Furnace product, % | 25.6 |
| d.b. mixture, % | 17.9 |

TABLE 29-continued

Caustic Digestion-Washing of Water-Washed Product in a Column

| | |
|---|---|
| Ash in product, % | 13.8 [a] |

[a]Variable temperature

The results of this digestion are more effective than the previous one (TABLE 27) due to lower ash and yield, presumably due to more extensive water washing.

The product described in TABLE 29 was digested with hydrochloric acid and washed with water in beakers (batch washing). The same procedure was used as that described earlier (TABLE 28) except the filtrate was not titrated. After digestion, the filtered residue was washed with hot (boiling) distilled water in four stages. Results are given in TABLE 30.

TABLE 30

Hydrochloric Acid Digestion-Washing of Caustic Digested-Washed Product

Run 90
NaOH-washed product = 99.6 g
Hydrochloric acid solution = 521.9 g, 22.1 g HCl (4.23% HCl)
Digestion time = 47 minutes
Digestion temperature ≃ 100° C. (boiling)

| | Liquids | | | |
|---|---|---|---|---|
| | Weight Water, g | Filtrate Weight, g | Volume, ml | Density, g/ml |
| Digestion liquor | 499.8 | 260.4 | 257 | 1.013 |
| 1st water wash | 200.6 | 220.8 | 220 | 1.004 |
| 2nd water wash | 201.5 | 199.6 | 199 | 1.003 |
| 3rd water wash | 200.4 | 192.5 | 195 | 0.987 |
| 4th water wash | 200.0 | 195.1 | 198 | 0.985 |
| water in wet solid | | 180.5 | 181 | 0.985 |
| Total | 1302.3 | 1248.9 | 1250 | 0.999 (Avg.) |

| Solids | |
|---|---|
| Ratio weights H$_2$O/product charge | 13.1 |
| Weight wet solid, g | 269.9 |
| H$_2$O in wet solid, % | 66.9 |
| Weight dry solid, g | 89.4 |
| Yield dry solid from | |
| NaOH-washed product, % | 89.8 |
| H$_2$O-washed product, % | 51.6 |
| Furnace product, % | 22.9 |
| d.b. mixture, % | 16.1 |
| Ash in product, % | 6.49 |
| Tamped density dry solid, g/ml | 0.264 |
| P as H$_3$PO$_4$ in product, % | 6.75 |
| Ash-free yield from d.b. wood, % | 46.7 |

The ash value reasonably agrees with that of the previous result (TABLE 26) and indicates significant leaching of additional salts from the NaOH digested-washed product. Again, the ash-free yield of product from the wood in the mixture is high and confirms the retardation of tar volatilization from wood by phosphoric acid. The specific total pore volume is estimated to be 2.02 ml/g by the calculation method previously described. The high pore volume substantiates the low tamped density of the final product. Despite the significant removal of inorganic matter present in the caustic-washed product, the residue from hydrochloric acid treatment still contains 6.8% P as H$_3$PO$_4$.

EXPERIMENT NO. 12 INVESTIGATION OF DIFFERENT BASES FOR DIGESTING-WASHING OF WATER-WASHED PRODUCT

Three different bases (NaOH, KOH, NH$_4$OH) were used in digesting-washing of water-washed product from Run 64 (TABLE 20) to determine effectiveness in leaching residual phosphoric acid salts retained in the product. As with the previous experiments, hydrochloric acid digestion-washing followed the treatment with the given base.

All digestions as well as water washing were done in a column using the up-flow mode. The column consisted of a 1000 ml burette of 5.0 cm bore. The burette was fitted with a 316 stainless steel wire mesh (100 Tyler screen) resting atop glass wool packed in the space at the bottom of the burette.

The basic solution was heated in a beaker to boiling on a hot plate, quickly weighed, and poured onto the char residue from the top of the burette. After allowing about 5 minutes for digestion, boiling hot distilled water was added through the stopcock at the bottom of the burette to a mark above the bed of char. Constant freeboard was maintained above the bed by siphoning the wash liquor into a cylinder. Unlike attempts to wash furnace product, no problem was encountered with floating particles although the rate of influent water was kept low enough (and equal to rate of effluent liquor) to prevent bed fluidization. Boiling hot distilled water was added through the burette stopcock from a reservoir on a hot plate by means of a siphon. This means of addition did not permit weighing the water influent on a continuous bases. At the completion of washing the column was allowed to thoroughly drain.

Each of the three basic solutions was fixed at the same molal concentration.

Results are furnished in TABLE 31.

TABLE 31

Comparing Three Bases in Extraction of Phosphoric Acid Salts from Water-washed Product

| | Base Used for Digestion | | |
|---|---|---|---|
| Run 64 | NaOH | KOH | NH$_4$OH |
| Weight water-washed product, d.b., g | 34.8 | 34.8 | 34.7 |
| Base Digestion and Washing | | | |
| Basic solution added, g | 148.2 | 159.7 | 161.6 |
| Weight of base, g | 9.53 | 13.36 | 8.34 |
| % of base in solution | 6.43 | 8.36 | 5.16 |
| Digestion time, min. | 5.0 | 5.0 | 7.0 |
| Approximate avg. digestion temp, °C. | 80 | 80 | 80 |
| Temperature of wash water, °C. | 100 | 100 | 100 |
| Weight of column effluent, g | 2075.2 | 2239.5 | 2081.6 |
| Rate of column effluent, g/min. | 138 | 70 | 130 |
| Phosphorous as H$_3$PO$_4$ in effluent, % | 0.722 | 0.574 | 0.171 |
| HCl Digestion and Washing | | | |
| HCl solution added, g | 118.8 | 118.8 | 119.1 |
| Weight HCl, g | 5.90 | 5.90 | 5.92 |
| % HCl in solution | 4.97 | 4.97 | 4.97 |
| Digestion time, min. | 8 | 5.0 | 6.0 |
| Approximate avg. digestion temp., °C. | 80 | 80 | 80 |
| Temperature wash water, °C. | 100 | 100 | 100 |
| Weight of column effluent, g | 1124.1 | 2239.5 | 801.5 |
| Rate of column effluent, g/min. | 224 | 240 | 240 |
| Solids from HCl-wash | | | |
| Weight dry solid residue, g | 19.5 | 20.8 | 28.9 |
| Yield dry solid, % | | | |
| from H$_2$O-washed product | 56.0 | 59.8 | 83.3 |
| from furnace product | 22.8 | 24.3 | 33.8 |
| from d.b. starting mixture | 16.4 | 17.5 | 24.4 |
| Ash in product, % | 9.96 | 16.8 | 39.6 |
| P as H$_3$PO$_4$ in final product, % | 10.4 | 17.5 | 41.2 |

From ash values and phosphorous found in leachates, it is obvious that sodium hydroxide digestion is most effective in removing phosphoric acid salts, followed by potassium hydroxide, and with ammonia being the least effective. Note that the ash for the caustic extracted product is higher than those undergoing the previously described caustic treatments (TABLE 29), probably as a result of the longer digestion allowed for the latter (5 min. versus 60 min.).

TABLE 32 gives a summary of all experiments involving digestion of water-washed product with base. All results given in TABLE 32 are based on the weight of starting materials.

TABLE 32

Summary of Data Relating to Digestion of Water-washed Products with a Base Followed by Hydrochloric Acid-washing Results calculated to starting mixture.

| | Run No. → | 64 | 90 | 89 |
|---|---|---|---|---|
| Furnacing | | | | |
| Weight starting mixture, d.b., g | | 824.9 | 825.2 | 825.2 |
| Weight starting acid (100% $H_3PO_4$ basis), g | | 558.7 | 559.0 | 559.0 |
| Average final temperature, °C. | | 515 | 552 | 721 |
| Hold time at final temperature, min. | | 40 | 10 | 10 |
| Weight furnace product, g | | 594.6 | 577.8 | 427.4 |
| Yield furnace product (F.P.) from dry basis (d.b.) mixture, % | | 72.1 | 70.0 | 51.8 |
| P as $H_3PO_4$ in furnace product, % | | 88.63 | 90.7 | 73.0 |
| Weight $H_3PO_4$, g | | 527.0 | 524.3 | 311.9 |
| Yield from starting acid, % | | 94.3 | 93.8 | 55.8 |
| $H_3PO_4$ volatilized during heating (by diff.), % | | 5.7 | 6.2 | 44.2 |
| Water Washing | | | | |
| Batch washing stages | | 10 | 6 | 6 |
| Approximate temperature wash water, °C. | | 100 | 100 | 80 |
| Weight total wash water, g | | 5475 | 3267 | 3168 |
| Ratio weights water to F.P. | | 9.18 | 5.65 | 7.41 |
| Total weight liquor (filtrate combined), g | | 5378 | 3936 | 3166 |
| Concentrated liquor, g | | 5378 | 503.9 | 858 |
| % $H_3PO_4$ (titration) | (Avg.) | 7.57 | 83.65 | 28.2 |
| Weight 100% $H_3PO_4$, g | | 407.2 | 421.5 | 241.9 |
| Yield $H_3PO_4$ from starting acid, % | | 72.9 | 75.4 | 43.3 |
| Water-washed Solid Residue | | | | |
| % $H_2O$ in wet residue | | 50.3 | 54.9 | 49.6 |
| Weight dry residue, g | | 241.5 | 215.4 | 183.1 |
| Yield from F.P., % | | 40.6 | 37.3 | 29.2 |
| Yield from d.b. mixture, % | | 29.3 | 26.1 | 22.2 |

Digestion with a Base and Washing

| | | | | Run 90 | | |
|---|---|---|---|---|---|---|
| Base used → | NaOH | KOH | NH4OH | NaOH | | NaOH |
| Run No. → | 64 | 64 | 64 | 1st | 2nd | 89 |
| Digestion | | | | | | |
| $H_2O$-washed product charge, g | 241.5 | 241.5 | 241.5 | 215.4 | 215.4 | 183.1 |
| Weight reagent solution, g | 1028.4 | 1108.2 | 1124.7 | 913.9 | 924.4 | 785.6 |
| % reagent in solution | 6.43 | 8.36 | 13.8 | 6.42 | 6.40 | 6.44 |
| Weight reagent, g | 66.1 | 92.7 | 155.2 | 58.65 | 59.2 | 50.6 |
| Ratio weights reagent/ charge, d.b. | 0.274 | 0.384 | 0.643 | 0.272 | 0.275 | 0.276 |
| Approximate temperature, °C. | 80 | 80 | 80 | 100 | 100 | 70 |
| Time, min. | 5.0 | 5.0 | 7.0 | 60 | 31 | 27 |
| Water Washing | | | | | | |
| Batch washing stages | ← column upflow → | | | 4 | 12 | column upflow |
| Total weight water added, g | — | — | — | 3319 | 7640 | — |
| Approximate temperature | 100 | 100 | 100 | 100 | 100 | 100 |
| Rate column effluent, g/min. | 138 | 70 | 130 | — | — | 100 |
| Weight effluent liquor, g | 14,401 | 15,542 | 14,487 | 3227 | 8522 | 6954 |
| % $H_3PO_4$ (colorimetric) | 0.722 | 0.574 | 0.171 | 2.75 | 1.081 | 0.2042 |
| Weight $H_3PO_4$ in liquor, g | 104.0 | 89.2 | 24.8 | 88.7 | 92.1 | 14.2 |
| Solid Residue | | | | | | |
| Weight dry solid, g | — | — | — | 164.3 | 147.7 | 139.8 |
| Yield dry solid, % | | | | | | |
| from $H_2O$-washed product | — | — | — | 76.3 | 68.6 | 76.4 |
| from furnace product | — | — | — | 28.4 | 25.6 | 32.7 |
| from d.b. starting mixture | — | — | — | 19.9 | 17.9 | 16.9 |
| Ash in dry product, % | — | — | — | 18.6 | 13.8 | — |
| HCl Digesting-Washing | | | | | | |
| Digestion | | | | | | |
| Weight dry NaOH-washed product charge, g | — | — | — | 164.3 | 147.7 | 139.8 |
| Weight HCl solution, g | 824.4 | 824.4 | 828.9 | 730.6 | 773.9 | 624.0 |
| % HCl | 4.97 | 4.97 | 4.97 | 4.97 | 4.23 | 4.97 |
| Weight HCl in solution, g | 40.94 | 40.94 | 41.2 | 36.3 | 32.8 | 31.0 |
| Ratio weight HCl/charge | — | — | — | 0.221 | 0.222 | 0.222 |
| Approximate temperature, °C. | 80 | 80 | 80 | 100 | 100 | 80 |

TABLE 32-continued

Summary of Data Relating to Digestion of Water-washed
Products with a Base Followed by Hydrochloric Acid-washing

| Time, min. | 8.0 | 5.0 | 6.0 | 60 | 47 | 13 |
|---|---|---|---|---|---|---|
| Water Washing | | | | | | |
| Batch washing stages | ← column upflow → | | | 4 | 4 | column upflow |
| Total weight water added, g | — | — | — | 4016 | 1931 | — |
| Approximate temperature, °C. | 100 | 100 | 100 | 100 | 100 | 100 |
| Weight effluent liquor, g | 7801 | 9037 | 5578 | 3930 | 1852 | 3439 |
| Rate column effluent, g/min. | 225 | 240 | 240 | — | — | 230 |
| HCl-Washed Residue | | | | | | |
| % $H_2O$ in wet solid | — | — | — | 62.6 | 66.9 | — |
| Weight dry solid, g | 135.3 | 144.3 | 201.1 | 138.8 | 132.6 | 123.7 |
| Yield dry solid, % | | | | | | |
| from NaOH-washed product | — | — | — | 84.5 | 89.8 | 88.5 |
| from $H_2O$-washed product | 56.0 | 59.8 | 83.3 | 64.4 | 51.6 | 67.6 |
| from furnace product | 22.8 | 24.3 | 33.8 | 24.0 | 22.9 | 28.9 |
| from d.b. mixture, % | 16.4 | 17.5 | 24.4 | 16.8 | 16.1 | 15.0 |
| P as $H_3PO_4$ in product, % | 10.4 | 17.5 | 41.2 | 6.79 | 6.75 | 39.5 |
| Weight $H_3PO_4$, g | 14.1 | 25.2 | 82.8 | 9.43 | 8.95 | 48.9 |
| As % $P_2O_5$ in product | 7.53 | 12.7 | 29.8 | 4.92 | 4.89 | 28.6 |
| Ash in product, % | 9.96 | 16.8 | 39.6 | 6.58 | 6.49 | 38.0 |

Sufficient data are given to construct a phosphoric acid balance around the process. The balance is given in TABLE 33 together with the major heating variables.

TABLE 33

Phosphoric Acid Balance

| Run No. → | 64 | 90 | 89 |
|---|---|---|---|
| Avg. Final Temp., °C. | 515 | 552 | 721 |
| Hold Time at Final Temp., min. | 40 | 10 | 10 |
| Acid/Sawdust ratio, d.b. | 2.10 | 2.10 | 2.10 |
| Starting Acid (100% $H_3PO_4$), g | 558.7 | 559.0 | 559.0 |

| | Percentage of Starting Acid | | | | | |
|---|---|---|---|---|---|---|
| Base → | NaOH | KOH | $NH_4OH$ | NaOH#1 | NaOH#2 | NAOH |
| $H_3PO_4$ volatilized (by diff.), % | 5.7 | 5.7 | 5.7 | 6.2 | 6.2 | 44.2 |
| $H_3PO_4$ water-extracted, % | 72.9 | 72.9 | 72.9 | 75.4 | 75.4 | 43.3 |
| $H_3PO_4$ extracted by base % | 18.6 | 16.0 | 4.4 | 15.9 | 16.7 | 2.5 |
| $H_3PO_4$ extracted by HCl (by diff.), % | 0.3 | 0.9 | 2.2 | 0.8 | 0.1 | 1.2 |
| $H_3PO_4$ in final product, % | 2.5 | 4.5 | 14.8 | 1.7 | 1.6 | 8.8 |
| Total, % | 100.0 | 100.0 | 100.0 | 100.0 | 100.0 | 100.0 |

The ability of bases to extract acid phosphate salts from the char residue decreases in the following order: NaOH, KOH, $NH_4OH$. Apparently, the size of the potassium ion which is involved in the double layer effect on surfaces of pores, restricts its effectiveness over caustic. The acid salts are difficult to extract apparently as a result of pore packing and inaccessibility to basic reagents. Higher concentration of base in particular should increase the extractability of the salts. With decrease in concentration, longer digestion times would be necessary even for caustic. Thus, solution concentration between 3% and 50% of the base would be effective; the preferred range is 3% to 10%. Of course, other bases may be used depending upon the phosphate salt desired.

Longer digestion with base gives slightly more extractability of the acid salts; for example the greater extraction of water-washed product from Run 90 is due to a longer digestion time (1 hour) compared to that of Run 64 (5 minutes). While long digestion times are more effective, the practicability of plant operation would use a digestion time not exceeding 30 minutes, preferably between 5 and 30 minutes.

Acid treatment does remove some phosphoric acid salts but its effect is small, although the extractability increases with decreasing effectiveness of the base employed. Other acids could be employed such as nitric, or sulfuric, depending upon possible end use of the resulting salts, e.g., sulfuric acid may be used for extraction with the objective of neutralizing the excess base in solution after extraction in order to render the resulting salts more suitable as a fertilizer; the concentration of the acid could be adjusted such that the excess base is completely neutralized by the excess acid.

Also more water extraction after base treatment increases the extent of acid salt extraction; compare the two caustic water extraction of Run 90 water-washed product. The preferred ration of water to water-extracted product is 10 to 20.

High temperature of heat treatment gives a char residue from which the acid salts are more difficult to remove by basic extraction. For Run 89, considerable acid salts remained in the carbon even though caustic concentration, digestion time, and water washes were entirely acceptable for the other caustic extractions given.

EXPERIMENT NO. 13 MATERIAL OF CONSTURCTION FOR CONTAINING A PHOSPHORIC ACID MIXTURE DURING THE PLASTIC STAGE

As previously described, when mixtures of phosphoric acid and carbonaceous materials are heated, a sticky mass is formed when heated, for ratios of the components of the mixture which exceed certain values, e.g., 1.6 parts of acid to 1 part of wood sawdust. This mass has a strong tendency to stick and subsequently cake on the walls of common materials of construction such as metal. After the mass has become dehydrated, granular free flowing particles are formed and devoid of any tendency to adhere to each other and to contacting surfaces of other materials.

Common steel, 316 stainless steel, graphite, and Teflon-coated containers were tested for tendency of the mixture to adhere to container walls during the plastic stage. The metals proved unsatisfactory; the plastic stage mixture strongly adhered to the walls and were subsequently baked onto the walls after continued heating beyond the plastic stage. The baked material could only be removed from the metal by strong, hot concentrated caustic followed by intensive scraping of the surface. Graphite proved much better but after repeated use, the baked material was strongly attached to the container walls but could be removed in flakes after caustic treatment and gouging.

Teflon-coated metal was tried and proved to be completely satisfactory to contain the mixture throughout the plastic stage up to 300° C. Higher temperatures could not be used due to vaporization of the Teflon coating. During the plastic stage the sticky material had no tendency to adhere to the container walls and the container could be emptied without any trace of the mixture on the container walls. As stated above with respect to FIG. 1, Teflon-coated metal is the preferred material of construction for heating the phosphoric acid-carbonaceous mixture through the plastic stage.

EXPERIMENT NO. 14 FURNACING A MIXTURE OF PHOSPHORIC ACID-EXTRACTED PRODUCT AND PHOSPHORIC ACID

The final acid-extracted furnace product (No. 2 Run 90 product given in TABLE 32) which had a pore volume greater than 2 ml./gm., was mixed with agricultural grade phosphoric acid from Freeport Chemical Co. and pine wood sawdust. Sufficient acid was added to a pre-weighed quantity of the char product until the char appeared completely wetted with no evidence of free acid. The ratio of acid to char amounted to 3.27 dry basis. Process and analytical data are furnished in TABLE 34.

TABLE 34

Processing a Mixture of Agricultural Grade Phosphoric Acid and a Phosphoric Acid-Char Residue Extracted with Water, Caustic and Hydrochloric Acid

|  | Run 94 |
| --- | --- |
| Charge |  |
| No. 2 Run 90 Final Char product (TABLE 32), g | 61.8 |
| Ash, d.b., % | 6.49 |
| Phosphoric Acid (100% H$_3$PO$_4$ basis), g | 202.1 |
| Weight of mixture, g | 263.9 |
| Heating |  |
| Heating rate to final temperature, °C./min. | 13.4 |
| Final average temperature, °C. | 511 |
| Hold time at final temperature, min. | 10 |
| Furnace Product weight, g | 238.6 |
| Yield F.P. from d.b. mixture, % | 90.4 |
| Furnace Product tamped density, g/ml | 0.777 |
| Water Extraction |  |
| Weight furnace product, g | 61.8 |
| Batch-washing stages, 200 g H$_2$O/wash | 6 |
| Temperature wash water, °C. | 27 |
| Weight total water, g | 1208 |
| Weight combined filtrates, g | 1197 |
| Recovered Acid |  |
| Concentrated filtrate, g | 198.3 |

TABLE 34-continued

Processing a Mixture of Agricultural Grade Phosphoric Acid and a Phosphoric Acid-Char Residue Extracted with Water, Caustic and Hydrochloric Acid

|  | Run 94 |
| --- | --- |
| % H$_3$PO$_4$ (titration) | 74.1 |
| Weight 100% H$_3$PO$_4$, g | 146.9 |
| % Fe$_2$O$_3$ (100% H$_3$PO$_4$ basis) | 0.1637 |
| Yield from starting acid, % | 72.7 |
| % Fe$_2$O$_3$ in starting acid (100% H$_3$PO$_4$ basis) | 1.50 |
| % Fe$_2$O$_3$ removed | 89.1 |
| Solid Residue |  |
| % H$_2$O in wet solid | 55.5 |
| Weight dry solid, g | 87.8 |
| Yield dry solid from F.P., % | 36.8 |
| from d.b. mixture, % | 33.3 |

The purification of the raw acid is comparable to that of heating the original mixture of the same raw acid and pine sawdust. The percentage water in wet solid is identical to that of the original water washed furnace product (TABLE 31) indicating no change in porosity of the washed char during the subsequent heat treatment. The yield of acid from the starting acid is comparable to that for heating the original mixture of the same acid and pine sawdust. Except for the limitation on the amount of raw phosphoric acid which the phosphoric acid extracted char can accomodate during mixing, the results are the same as those using a mixture of pine sawdust and raw phosphoric acid. Thus, the char can be recycled to the mixing stage with no deleterious effects on purification of acid if the proper acid-to-char ratio is used.

EXPERIMENT NO. 15 THREE-STAGE RECYCLING OF ACID TO FURNACE

To determine the degree of acid purification possible, the starting agricultural grade phosphoric acid was processed with pine sawdust, in the usual manner and the resulting extracted acid was processed again, then finally a third time using the twice-purified acid. The water-extracted acid from Run 90 previously described (TABLE 32) was used for the second stage. The results given in TABLE 35 are expressed in terms of the original starting mixture, i.e., compensating for sample withdrawals.

TABLE 35

Effects of Recycling Agricultural Grade Phosphoric Acid in Three Stages on Purification of the Acid

|  | 1st Stage | 2nd Stage | 3rd Stage |
| --- | --- | --- | --- |
| Run No. → | 90 | 92 | 93 |
| Charge |  |  |  |
| Acid Used | Ag. grade | Run 90 | Run 92 |
| % H$_3$PO$_4$ | 77.3 | 83.65 | 86.5 |
| Weight (100% H$_3$PO$_4$ basis), g | 559.0 | 421.5 | 375.9 |
| Pine sawdust, dry basis, g | 266.2 | 200.7 | 179.0 |
| Weight dry basis mixture, g | 825.2 | 622.2 | 554.9 |
| Acid/sawdust weight ratio, d.b. | 2.10 | 2.10 | 2.10 |
| Heating |  |  |  |
| Heating rate to final temp. °C./min | 7.68 | 9.45 | 10.01 |
| Hold time at final temp., min. | 10 | 10 | 10 |
| Final avg. temp., °C. | 552 | 550 | 550 |
| Furnace Product, g | 557.8 | 337.7 | 282.3 |
| Yield from d.b. charge, % | 70.0 | 73.1 | 71.7 |
| Yield from starting d.b. mixt., % | 70.0 | 51.2 | 36.7 |
| Water Washing |  |  |  |
| Stages (batch washing) | 6 | 5 | 4 |
| Weight total water, g | 3267 | 2168 | 2098 |
| Ratio weights water/F.P. | 5.65 | 6.42 | 7.43 |

TABLE 35-continued

Effects of Recycling Agricultural Grade Phosphoric Acid in Three Stages on Purification of the Acid

| Run No. → | 1st Stage 90 | 2nd Stage 92 | 3rd Stage 93 |
|---|---|---|---|
| Weight combined filtrates, g | 3936 | 2109 | 1952 |
| Recovered Acid | | | |
| Concentrated acid, g | 503.9 | 434.5 | 498.1 |
| % $H_3PO_4$ | 83.65 | 86.5 | 62.9 |
| Weight (100% $H_3PO_4$ basis), g | 421.5 | 375.9 | 313.3 |
| Yield from charged acid, % | 75.4 | 89.2 | 83.3 |
| % $Fe_2O_3$ (100% $H_3PO_4$ basis) | 0.1721 | 0.1526 | 0.1365 |
| *% $Fe_2O_3$ removed for each stage | 88.5 | 11.3 | 10.6 |

*% $Fe_2O_3$ in starting acid (100% $H_3PO_4$) = 1.50.

Purification of the starting acid in the first stage is drastic amounting to 88% iron removal. The iron removal becomes slight and progressively smaller in successive stages. The water washing stages were not the same, but the number of washing stages do not effect the results of acid purification. However, the lower washing stages for the second and third runs do affect the total pore volume (in terms of percentage water in the wet filter cake) and yield values. Despite the lower number of water extractions for the second stage process, the yield of acid in the water extract is appreciably higher than that for the raw acid used in the first stage (75% vs. 89%). The reason for this increase is that the deposition of phosphoric acid metallic salts onto the char pores is much greater for the raw acid than for the first-stage purified acid used in the second stage. These metallic salts remain relatively unleached as a result of water washing. Thus, more free acid is leached in the second stage process and in subsequent stages, washing being the same for each furnace product.

EXPERIMENT NO. 16 ION-EXCHANGING PURIFIED ACID

As mentioned earlier, the purification of agricultural grade phosphoric acid by the process of heating a mixture of the acid and carbonaceous matter is not as effective for alkalies and alkaline earths as it is for the transition metals and metals of high valence. On the other hand, alkalies and alkaline earth ions are easily removed by ion-exchangers of the H-type.

Thus, two ion-exchangers were tested on the purified acid produced in Run 88 (TABLE 21), one a zeolite (sodium ion-exchanger) and the other a (hydrogen ion-exchanger). The sodium ion-exchanger was "Dowex HCR-5 Na" which is essentially a sodium salt of styrene sulfonate. The hydrogen ion-exchanger was "Dowex 50W-X8", which was strongly acidic.

The sodium ion-exchanger was used in a column and the hydrogen ion-exchanger was used in a beaker. The resin was supported by a 100 mesh S.S. screen resting on glass wool packed into the bottom of a 500 ml burette. The acid feed was poured into the burette in an amount barely sufficient to cover the resin bed. The resin volume in the burette measured 235 ml. The acid was allowed to drip from the burette with a contact time of one hour.

In the second test the hydrogen ion exchanger resin was weighed into a beaker and sufficient acid was added to cover the resin. The beaker contents were swirled intermittently during one hour of contact time. The acid was filtered into a dry vacuum flask through a circle of Whatman No. 5 filter paper on a Büchner funnel. Each of the feed acid and ion-exchanged acids was analyzed for various metals by atomic absorption as well as titrated for percentage phosphoric acid with standardized caustic solution to the second equivalence point using phenolpthalein indicator. Results are furnished in TABLE 36.

TABLE 36

Ion-Exchange of Purified Agricultural Grade Phosphoric Acid

| | Feed Recovered Purified Acid From Run 88 | Column Test Test Using Na-Ion Exchanger | Beaker Test Using Hydrogen Ion Exchanger |
|---|---|---|---|
| Charge | | | |
| Resin weight, g | — | 142.0 | 96.8 |
| Acid weight, g | — | 60.1 | 112.2 |
| Acid Analysis, ppm | | | |
| % $H_3PO_4$ (titration) | 9.96 | 6.64 | 13.6 |
| Fe | 217 | 177 | 57.0 |
| Mg | 406 | 4.06 | 2.14 |
| Ca | 66.7 | 18.9 | 5.00 |
| Na | 50.3 | 9470 | 29.4 |
| K | 24.0 | 4.90 | 1.00 |
| Reduction of components, % | | | |
| Fe | — | 18.4 | 73.7 |
| Mg | — | 99.0 | 99.5 |
| Ca | — | 71.7 | 92.5 |
| Na | — | −87.3 | 41.6 |
| K | — | 79.6 | 95.8 |

Of course, the basic sodium ion-exchanger reduces the phosphoric acid concentration which also increases the sodium ion content of the acid. The latter effect is reversed for the hydrogen ion-exchanger, i.e., increases the hydrogen ion content (increases acidity) of the acid in exchange for cations. The H-type exchanger is more effective than the Zeolite. The combination of the process of this invention and the application of a suitable ion-exchanger will produce a highly purified acid applicable in all industries presently using technical grade phosphoric acid.

The process is applicable to the extraction of uranium from the raw phosphoric acid. Since any uranium present in the acid would be concentrated in the solid carbon residue by the process of this investigation, the uranium can be extracted by a number of different schemes, including hot concentrated caustic digestion or, by burning the carbon residue and extracting the uranium concentrated in the ash thereof.

The foregoing disclosure and description of the invention are illustrative and explanatory thereof, and various changes in the size, shape and materials, as well as in the details of the illustrated construction may be made without departing from the spirit of the invention.

I claim:

1. A method for purifying phosphoric acid comprising the steps of:
    mixing a porous carbonaceous material with phosphoric acid having impurities therewith;
    heating and agitating the mixture of carbonaceous material and phosphoric acid at a temperature between about 100° C. and about 300° C. so as to affect dehydration of the mixture; and then thereafter heating said mixture of carbonaceous material and phosphoric acid at a temperature between about 200° C. and about 1000° C., and
    after said heating and agitating, then washing said mixture with a solvent to dissolve the phosphoric acid which has thus been purified.

2. The method of claim 1, further comprising:
    after said washing of said mixture with said solvent to dissolve said phosphoric acid which has thus been purified, further repeatedly purifying, according to the steps of claim 1, said phosphoric acid with porous carbonaceous material not previously used, to achieve cumulatively increasing degrees of purity.

3. The method of claim 1, wherein both steps of heating and agitating said mixture of said carbonaceous material and phosphoric acid to a temperature of from about 100° C. to about 300° C. and thereafter heating of said mixture of carbonaceous material and phosphoric acid to a temperature of from about 200° C. to about 1000° C. are carried out in a single furnacing unit.

4. A method for purifying phosphoric acid comprising the steps of:
    mixing a sufficient amount of predried porous carbonaceous material with a sufficient amount of phosphoric acid having impurities therewith, so that the phosphoric acid can permeate the carbonaceous material;
    heating for a sufficient time and agitating the mixture of carbonaceous material and phosphoric acid to a sufficient temperature to effect dehydration of the mixture;
    then thereafter heating said mixture of carbonaceous material and phosphoric acid to a temperature of from about 200° C. to about 1000° C.; and
    washing the residue of the heated mixture with an amount of solvent sufficient to dissolve the acid which has been purified.

5. The method of claim 4, wherein both steps of heating and agitating of said mixture of said carbonaceous material and phosphoric acid to a temperature of from about 160° C. to about 280° C. and thereafter heating said mixture of carbonaceous material and phosphoric acid to a temperature of from about 200° C. to about 1000° C. are carried out in a single furnacing unit.

6. The method of claim 1 or claim 4, wherein said porous carbonaceous material contains cellulose.

7. The method of claim 1 or claim 4, further comprising after said washing of said mixture then removing a portion of said solvent to concentrate the purified phosphoric acid.

8. The method of claim 1 or claim 4, wherein said washing is carried out at a temperature between ambient and boiling.

9. The method of claim 1 or claim 4, wherein said washing is carried out at a temperature of from about 50° C. to about 70° C.

10. The method of claim 1 or claim 4, wherein said porous carbonaceous material is selected from the group consisting of wood, bagasse, nutshells, fruit pits, rice hulls, paper, cotton, plant remains, chars, active carbon, coal, coke or sawdust.

11. The method of claim 1 or claim 4, wherein said phosphoric acid is wet process phosphoric acid obtained from the reaction of a complex phosphate compound with an acid selected from the group consisting of either sulfuric acid or hydrochloric acid.

12. The method of claim 1 or claim 4, wherein the percent of purity of said acid which has been purified is at least 75%.

13. The method of claim 1 or claim 4, wherein said porous carbonaceous material is predried sawdust with a moisture content of from about 5.0% by weight to about 15.0% by weight.

14. The method of claim 1 or claim 4, wherein:
    from about 0.5 parts by weight to about 5.0 parts by weight of phosphoric acid having impurities therewith are mixed with about 1 part by weight porous carbonaceous material.

15. The method of claim 1 or claim 4, wherein:
    said heating and agitating is carried out at a temperature of from about 160° C. to about 280° C. so as to effect dehydration of said mixture and so that said mixture becomes granular and of a free-flowing consistency; and
    wherein the subsequent heating of said mixture of carbonaceous material and phosphoric acid is to a temperature of from about 400° C. to about 600° C.

16. The method of claim 15, wherein both steps of heating and agitating said mixture of said carbonaceous material and phosphoric acid to a temperature of from about 160° C. to about 280° C. and thereafter heating said mixture of carbonaceous material and phosphoric acid to a temperature of from about 400° C. to about 600° C. are carried out in a single furnacing unit.

17. The method of claim 1 or claim 4, wherein:
    said washing of said residue of said heated mixture with an amount of solvent sufficient to dissolve said acid which has been purified is accomplished by the use of a sufficient amount of two streams of phosphoric acid-containing water, which streams flow past each other in opposite directions.

18. The method of claim 1 or claim 4, further comprising:
    after said washing of said mixture then contacting said mixture of carbonaceous material and phosphoric acid with a sufficient amount and combination of a dilute alkaline or ammoniacal solution to further remove phosphoric acid that is chemically bound to said carbonaceous material and phosphoric acid inorganic impurities.

19. The method of claim 1 of claim 4, wherein:
    the impurity-containing carbonaceous material, which has been washed to dissolve said phosphoric acid, is reused in the method for purifying said phosphoric acid, with or without the use of carbonaceous material not previously used.

20. A method for purifying phosphoric acid comprising the steps of:
    mixing from about 0.5 parts by weight to about 5.0 parts by weight phosphoric acid having impurities therewith with about 1 part by weight predried sawdust which has a moisture content of about 5.0% by weight to about 15.0% by weight, so that the phosphoric acid can permeate the carbonaceous material;

heating and agitating the mixture of carbonaceous material and phosphoric acid to a temperature of from about 160° C. to about 280° C. so as to effect dehydration of the mixture and so that the mixture becomes granular and of a free-flowing consistency;

then thereafter heating said mixture of carbonaceous material in phosphoric acid to a temperature of from about 400° C. to about 600° C.; and washing the residue of the heated mixture with a sufficient amount of two streams of phosphoric acid-containing water, which streams flow past each other in opposite directions, to dissolve the acid which has been purified.

21. The method of claim 20, wherein both steps of heating and agitating of said mixture of said carbonaceous material and phosphoric acid to a temperature of from about 160° C. to about 280° C. and thereafter heating said mixture of carbonaceous material and phosphoric acid to a temperature of from about 400° C. to about 600° C. are carried out in a single furnacing unit.

22. The method of claim 20, wherein:
the ratio of acid by weight to porous carbonaceous material by weight is between about 1.0 and 2.5.

23. The method of claim 20, further comprising:
after said washing of said mixture then contacting said mixture of carbonaceous material and phosphoric acid with a sufficient amount of a solution selected from the group consisting of a dilute alkaline solution, ammoniacal solution, and a combination thereof, to further recover phosphoric acid salts that are chemically bound to said carbonaceous material and phosphoric acid inorganic impurities.

24. The method of claim 20, wherein:
the impurity-containing carbonaceous material, which has been washed to dissolve said phosphoric acid, is reused in the method for purifying said phosphoric acid, with or without the use of carbonaceous material not previously used.

* * * * *